(12) United States Patent
Zen et al.

(10) Patent No.: US 12,453,460 B2
(45) Date of Patent: Oct. 28, 2025

(54) MOVABLE OPTICAL UNIT, OPTICAL ADAPTER, AND ENDOSCOPE APPARATUS

(71) Applicant: EVIDENT CORPORATION, Nagano (JP)

(72) Inventors: Kenichi Zen, Tachikawa (JP); Masayuki Hio, Hachioji (JP)

(73) Assignee: Evident Corporation, Nagano (JP)

( * ) Notice: Subject to any disclaimer, the term of this patent is extended or adjusted under 35 U.S.C. 154(b) by 483 days.

(21) Appl. No.: 17/969,986

(22) Filed: Oct. 20, 2022

(65) Prior Publication Data

US 2023/0255449 A1  Aug. 17, 2023

(30) Foreign Application Priority Data

Feb. 16, 2022  (JP) ................................ 2022-022195

(51) Int. Cl.
*A61B 1/00* (2006.01)
*B23K 20/02* (2006.01)
(Continued)

(52) U.S. Cl.
CPC .......... *A61B 1/00096* (2013.01); *G02B 7/025* (2013.01); *G02B 7/04* (2013.01);
(Continued)

(58) Field of Classification Search
CPC ....................... A61B 1/00096; A61B 1/00101; G02B 7/025; G02B 7/04; G02B 7/14; G02B 23/2476; G02B 7/08; G02B 23/2423; G02B 23/243; G02B 23/2484; H01F 7/081; H01F 7/126; H01F 7/14; B23K 20/02; B23K 20/10; B23K 2103/05; B23K 20/023; B23K 20/227; B23K 20/233

See application file for complete search history.

(56) References Cited

U.S. PATENT DOCUMENTS

| | | | |
|---|---|---|---|
| 2012/0002309 A1* | 1/2012 | Okita | G02B 26/02 |
| | | | 359/823 |
| 2018/0235452 A1* | 8/2018 | Okita | A61B 1/06 |
| 2022/0388092 A1* | 12/2022 | Chuang | B23K 20/16 |

FOREIGN PATENT DOCUMENTS

| | | |
|---|---|---|
| JP | 2004-095703 A | 3/2004 |
| JP | 2013-120118 A | 6/2013 |

(Continued)

OTHER PUBLICATIONS

Japanese Office Action dated May 13, 2025 received in 2022-022195.

*Primary Examiner* — Thomas K Pham
*Assistant Examiner* — Jennifer A Jones
(74) *Attorney, Agent, or Firm* — Scully, Scott, Murphy & Presser, P.C.

(57) ABSTRACT

A movable optical unit configured to be rotatable around an axis by an electromagnet includes a fixed shaft, a bearing through which the fixed shaft is inserted and which is polarized in a direction orthogonal to a long axis of the fixed shaft, a holding frame that is provided to be rotatable around the fixed shaft and holds at least one optical member, and a pair of arm members extending outward from the holding frame in a direction orthogonal to the long axis of the fixed shaft, the pair of arm members being bonded to the bearing in a state of sandwiching the bearing in a direction along the long axis of the fixed shaft.

14 Claims, 14 Drawing Sheets

(51) Int. Cl.
  *G02B 7/02*   (2021.01)
  *G02B 7/04*   (2021.01)
  *G02B 7/14*   (2021.01)
  *G02B 23/24*  (2006.01)
  *H01F 7/08*   (2006.01)
  *H01F 7/126*  (2006.01)

(52) U.S. Cl.
  CPC ........... *G02B 7/14* (2013.01); *G02B 23/2476* (2013.01); *H01F 7/081* (2013.01); *H01F 7/126* (2013.01); *B23K 20/02* (2013.01)

(56) References Cited

FOREIGN PATENT DOCUMENTS

| | | | |
|---|---|---|---|
| JP | 2015134033 A | * | 7/2015 |
| JP | 2015-210501 A | | 11/2015 |
| JP | 2015208635 A | | 11/2015 |
| JP | 2019028366 A | * | 2/2019 |

* cited by examiner

MOVABLE OPTICAL UNIT, OPTICAL ADAPTER, AND ENDOSCOPE APPARATUS

This application claims the benefit of Japanese Application No. 2022-022195 filed in Japan on Feb. 16, 2022, the contents of which are incorporated herein by this reference.

BACKGROUND OF THE INVENTION

1. Field of the Invention

The present invention relates to a movable optical unit included in an optical apparatus applied to an endoscope apparatus, an optical adapter provided with the optical apparatus including the movable optical unit and attached to a distal end portion of an insertion portion of the endoscope apparatus, and the endoscope apparatus provided with the optical apparatus including the movable optical unit at the distal end portion of the insertion portion.

2. Description of Related Art

Endoscope apparatuses have been widely used in, for example, a medical field, industrial field, and the like. General endoscope apparatuses include an insertion portion having an elongated tube shape, and a distal end portion provided at a distal end of the insertion portion.

Among them, a medical endoscope apparatus is used by inserting an insertion portion including an image pickup unit into, for example, a body cavity of a living body. At this time, the image pickup unit acquires an image of a lesion part or the like inside an organ or the like of a living body. A user of the endoscope apparatus observes or examines a state of a lesion part or the like based on the image acquired using the endoscope apparatus.

In addition, an industrial endoscope apparatus is used by inserting an insertion portion provided with an image pickup unit into an apparatus such as a jet engine or a factory piping, or into a mechanical facility. At this time, the image pickup unit acquires an image of a flaw, corrosion, or the like inside the target apparatus or machine facility. A user of the endoscope apparatus observes or examines a state of a flaw, corrosion, or the like based on the image acquired by using the endoscope apparatus.

An existing endoscope apparatus of this type is generally configured such that an optical apparatus including an observation optical system for forming an optical image of an observation object on a predetermined light receiving surface is provided at a distal end portion of an insertion portion. Various optical apparatuses used in existing endoscope apparatuses have been proposed, for example, in Japanese Patent Application Laid-Open Publication No. 2015-210501, which have a configuration including a mechanism for making the optical characteristics of the observation optical system variable.

The optical apparatus of the endoscope apparatus disclosed in Japanese Patent Application Laid-Open Publication No. 2015-210501 is configured to include a movable optical unit composed of a holding frame for holding an optical member and a shaft member made of a permanent magnet for rotatably holding the holding frame, and an electromagnetic drive unit for rotating the movable optical unit around an axis of the shaft member by an electromagnet. The optical apparatus has a configuration in which by rotating the movable optical unit around the axis of the shaft member using the electromagnetic drive unit, the optical member is inserted into or retracted from an optical path of the observation optical system. In this case, the holding frame is provided rotatably in a direction orthogonal to the optical axis of the observation optical system.

With such a configuration, the optical apparatus can switch to an observation optical system having different optical characteristics when the optical member is caused to enter the optical path of the observation optical system and when the optical member is caused to retract from the optical path of the observation optical system.

Meanwhile, in the optical apparatus having such a configuration, a configuration different from the configuration described in the above-mentioned publication may be considered. For example, a bearing member configured to be rotatable with respect to a fixed shaft is provided, and the bearing member is configured with a permanent magnet. The bearing member and the holding frame are integrally configured. Even in such a configuration, the holding frame can be configured to be rotatable around the fixed shaft by using the electromagnetic drive unit substantially in the same manner as in the optical apparatus described in the above publication.

In general, there is always a demand for a reduction in size and diameter of endoscope apparatus. In addition to this, also there is always a demand to reduce the cost of endoscope apparatuses. As the size and diameter of the endoscope apparatus are reduced, various components configuring the endoscope apparatus are also reduced in size.

SUMMARY OF THE INVENTION

A movable optical unit of an aspect of the present invention, which is configured to be rotatable around an axis by an electromagnet, includes a fixed shaft, a bearing through which the fixed shaft is inserted and which is polarized in a direction orthogonal to a long axis of the fixed shaft, a holding frame that is provided to be rotatable around the fixed shaft and holds at least one optical member, and a pair of arm members extending outward from the holding frame in a direction orthogonal to the long axis of the fixed shaft, in which the pair of arm members are bonded to the bearing in a state of sandwiching the bearing in a direction along the long axis of the fixed shaft.

An optical adapter of an aspect of the present invention, which is configured to be attachable to and detachable from a distal end portion of an insertion portion of an endoscope apparatus, includes an optical apparatus including: a movable optical unit provided with a fixed shaft, a bearing through which the fixed shaft is inserted and which is polarized in a direction orthogonal to a long axis of the fixed shaft, a holding frame that is provided to be rotatable around the fixed shaft and holds at least one optical member, and a pair of arm members extending outward from the holding frame in the direction orthogonal to the long axis of the fixed shaft, the pair of arm members being bonded to the bearing in a state of sandwiching the bearing in a direction along the long axis of the fixed shaft and configured to be rotatable around the fixed shaft; and an electromagnetic drive unit that has an electromagnet acting on a magnetic pole of the bearing and rotates the bearing around the fixed shaft by the electromagnet.

An endoscope apparatus of an aspect of the present invention which is provided with an optical apparatus including a movable optical unit at a distal end portion of an insertion portion, includes:

the optical apparatus including
the movable optical unit provided with a fixed shaft, a bearing through which the fixed shaft is inserted and which is polarized in a direction orthogonal to a long axis of the fixed shaft, a holding frame provided to be rotatable around the fixed shaft and holding at least one optical member, and a pair of arm members extending outward from the holding frame in a direction orthogonal to the long axis of the fixed shaft, the pair of arm members being bonded to the bearing in a state of sandwiching the bearing in a direction along the long axis of the fixed shaft and configured to be rotatable around the fixed shaft, and an electromagnetic drive unit that has an electromagnet acting on a magnetic pole of the bearing and rotates the bearing around the fixed axis by the electromagnet;

an observation optical system that forms an optical image of an observation object on a predetermined light receiving surface; and an image pickup device that receives an optical image formed by the observation optical system and performs predetermined photoelectric conversion, in which by rotating the bearing around the fixed shaft by the electromagnetic drive unit, the holding frame is rotated between a first position where the optical member is positioned on an optical axis of the observation optical system and a second position where the optical member is retracted from an optical axis of the observation optical system.

DETAILED DESCRIPTION OF PREFERRED EMBODIMENTS

Figure 1:
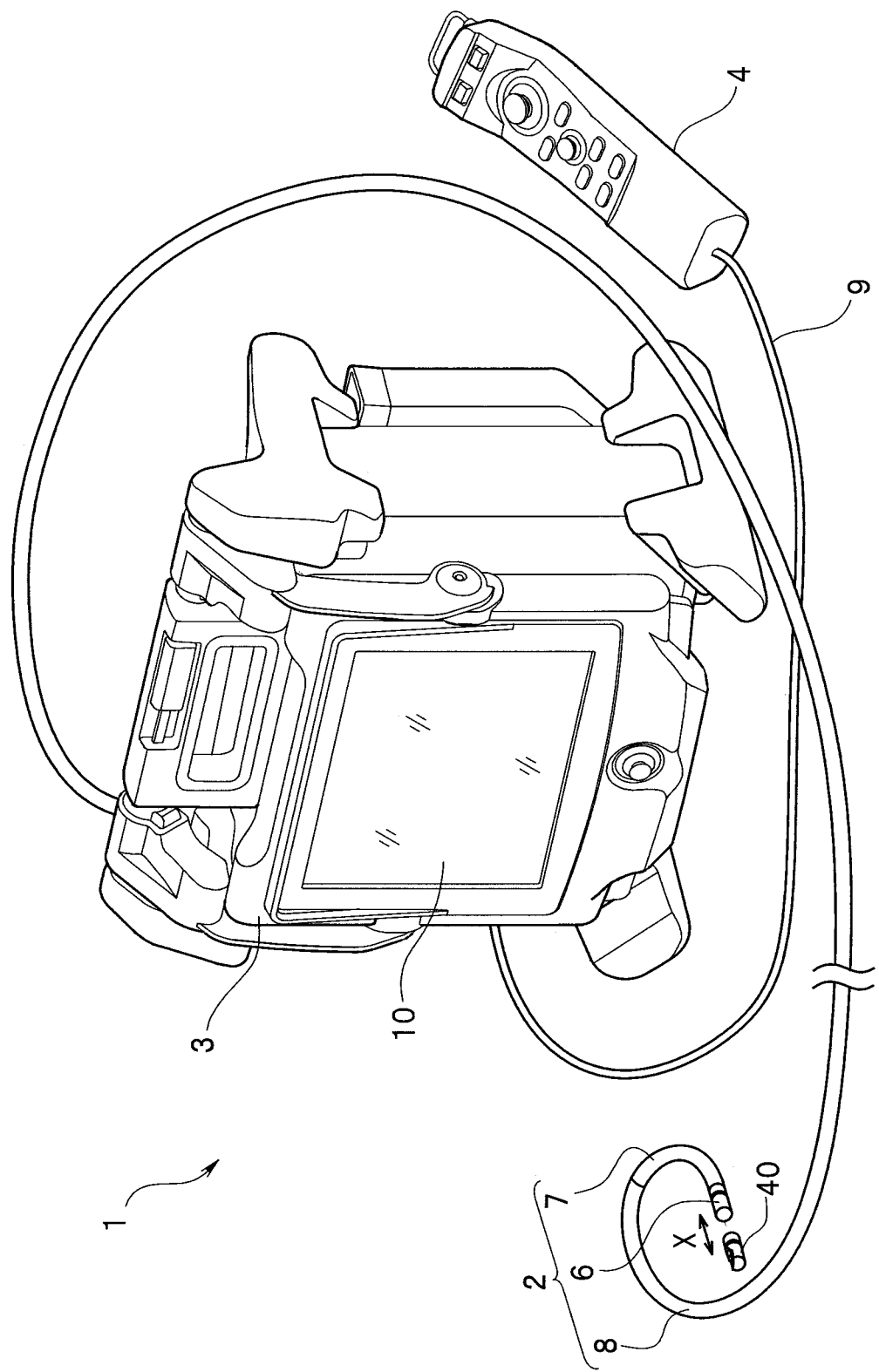
FIG. 1 is an overall configuration diagram of an endoscope apparatus in which an optical apparatus including a movable optical unit of a first embodiment of the present invention is provided at a distal end portion of an insertion portion.

In general, when miniaturization of various components in an endoscope apparatus is advanced, more strict consideration is required in terms of strength and accuracy. For example, as described above, when the bearing member made of a permanent magnet is integrally formed with the holding frame, adhesive bonding or the like is generally considered as a means for bonding and integrating the bearing member and the holding frame. However, as the size of each component is reduced, there is a possibility that an adhesion area of a portion where the bearing member and the holding frame are bonded to each other cannot be sufficiently secured, and necessary bonding strength cannot be secured.

In particular, the holding frame holds a relatively heavy optical member and is a movable member. Therefore, for example, when an impact or the like from the outside is applied to the optical apparatus, a predetermined stress is applied to a bonding portion between the bearing member and the holding frame. In this case, it is well known that the larger the adhesion area between the bearing member and the holding frame, the higher the bonding strength can be secured. Therefore, when such a configuration is adopted, it is always necessary to take measures to secure a sufficient adhesion area, secure a sufficient bonding strength, and obtain necessary impact resistance.

According to an embodiment of the present invention described below, it is possible to provide a movable optical unit, an optical adapter, and an endoscope apparatus having a structure capable of suppressing breakage, damage, or the like when receiving an impact or the like from the outside and ensuring necessary impact resistance even when components are reduced in size along with miniaturization.

The present invention will be described with reference to embodiments illustrated in the drawings. Each drawing used in the following description is schematically illustrated, and in order to illustrate each constituent element in a recognizable size on the drawing, a dimensional relationship, a scale, or the like of each member may be illustrated differently for each constituent element. Therefore, the present invention is not limited only to the embodiments illustrated in the drawings with respect to the number of each constituent element, the shape of each constituent element, the ratio of the size of each constituent element, the relative positional relationship of each constituent element, and the like illustrated in each drawing.

First, an overall configuration of an endoscope apparatus in which an optical apparatus including a movable optical unit of a first embodiment of the present invention is provided at a distal end portion of an insertion portion will be briefly described below with reference to FIG. 1. FIG. 1 is an overall configuration diagram of the endoscope apparatus in which the optical apparatus including the movable optical unit of the first embodiment of the present invention is provided at the distal end portion of the insertion portion.

As illustrated in FIG. 1, the endoscope apparatus 1 is configured to include an insertion portion 2, a main body portion 3, an operation portion 4, and the like.

The insertion portion 2 is formed in an elongated and flexible tubular shape as a whole. A proximal end of the insertion portion 2 is connected to the main body portion 3. The insertion portion 2 is configured by consecutively connecting a distal end portion 6, a bending portion 7, and a flexible tube portion 8, in this order from a distal end side.

Although not illustrated in detail, the distal end portion 6 has a known basic configuration such as a distal end portion main body, an optical apparatus, an image pickup device and a driving circuit thereof, and an illumination optical system and the like.

Here, although not illustrated in FIG. 1, the optical apparatus is provided inside the distal end portion 6 of the insertion portion 2 of the endoscope apparatus 1. The optical apparatus includes an observation optical system including an observation window and a plurality of optical lenses. The optical apparatus includes a mechanism for changing the optical characteristics of the observation optical system by inserting or retracting a predetermined optical member into or from an optical path of the observation optical system. Therefore, the optical apparatus includes a movable optical unit composed of an optical member and a holding frame that holds the optical member, and an electromagnetic drive unit that rotates the movable optical unit around a predetermined axis by an electromagnet. Note that a more detailed configuration of the optical apparatus will be described later.

In addition, the image pickup device is a well-known electronic device configured of a charge coupled device (CCD), a complementary metal-oxide-semiconductor (CMOS), or the like. In addition, the illumination optical system composed of an optical member such as an observation window, an illumination device such as an optical fiber or a light emitting device and a driving circuit thereof, and the like.

Various types of optical adapters 40 can be attached to the distal end of the distal end portion 6 appropriately as needed. In this case, an attachment/detachment direction of the optical adapter 40 is a direction indicated by an arrow X in FIG. 1. The attachment/detachment direction indicated by the arrow X is parallel to an insertion axis of the insertion portion 2.

Note that various types of optical adapters are available as the optical adapter 40. For example, there is an optical adapter for changing a visual field direction, such as a side-view optical adapter for ensuring a lateral visual field. Further, there is an optical adapter having a function of changing a focus range by adding a predetermined optical member on the optical path of the observation optical system. Further, there is an optical adapter (corresponding to an optical apparatus including the movable optical unit of the present embodiment; details will be described later) that inserts or retracts a predetermined optical member into or from the optical path of the observation optical system to convert the optical characteristics of the observation optical system, or the like.

The bending portion 7 is a tubular portion that can actively perform a bending operation in response to an operation from the operation portion 4. A distal end of the bending portion 7 is connected to a proximal end side of the distal end portion 6. A distal end of the flexible tube portion 8 is connected to a proximal end of the bending portion 7. A proximal end of the flexible tube portion 8 is connected to the main body portion 3.

Note that the basic configurations of the distal end portion 6, the bending portion 7, and the flexible tube portion 8, which configure the insertion portion 2, are the same as those of an existing known endoscope apparatus, and a detailed description thereof will be omitted.

The main body portion 3 incorporates a central processing unit (CPU), a ROM, a RAM, a control section, an image processing section, a light source, a large-capacity storage device, a display device 10, and the like. The proximal end of the insertion portion 2 is connected to the main body portion 3. On the display device 10 of the main body portion 3, various kinds of information and the like are displayed in addition to an image or the like acquired by an image pickup device (not illustrated) of the distal end portion 6.

The operation portion 4 is connected to the main body portion 3 through a cable 9. The operation portion 4 includes various operation members such as a joystick and a push-button type member. For example, a user of the endoscope apparatus 1 can bend the bending portion 7 of the insertion portion 2 in a desired direction by operating the joystick of the operation portion 4. Further, the user of the endoscope apparatus 1 can display a still image, a moving image, or the like on the display device 10 in a predetermined form by pushing a predetermined push button.

For example, the user of the endoscope apparatus 1 inserts the insertion portion 2 into an examination target such as piping, and positions the observation window of the distal end portion 6 in the vicinity of an examination region. Accordingly, the image pickup device of the distal end portion 6 of the insertion portion 2 in the endoscope apparatus 1 acquires an image of the examination region. The endoscope image thus acquired is displayed on the display device 10. At the same time, the endoscope image is recorded in the storage device as still image data or moving image data.

Note that in the endoscope apparatus 1 illustrated in FIG. 1, a form in which the insertion portion 2 and the main body portion 3 are integrally formed is exemplified. However, not limited to this embodiment, for example, the insertion portion 2 and the main body portion 3 may be configured to be attachable and detachable by a connector or the like. Further, the endoscope apparatus of the type in which the insertion portion 2 and the main body portion 3 are separable may be configured as an endoscope in which the insertion portion 2 and the operation portion 4 are integrated as a form different from the form exemplified in FIG. 1. In this case, the endoscope may be a form configured to be attachable to and detachable from the main body portion including the display device. Furthermore, the endoscope apparatus may be of a type composed of an endoscope in which the insertion portion 2, the operation portion 4, and the display device 10 are integrated and the main body portion.

Figure 2:
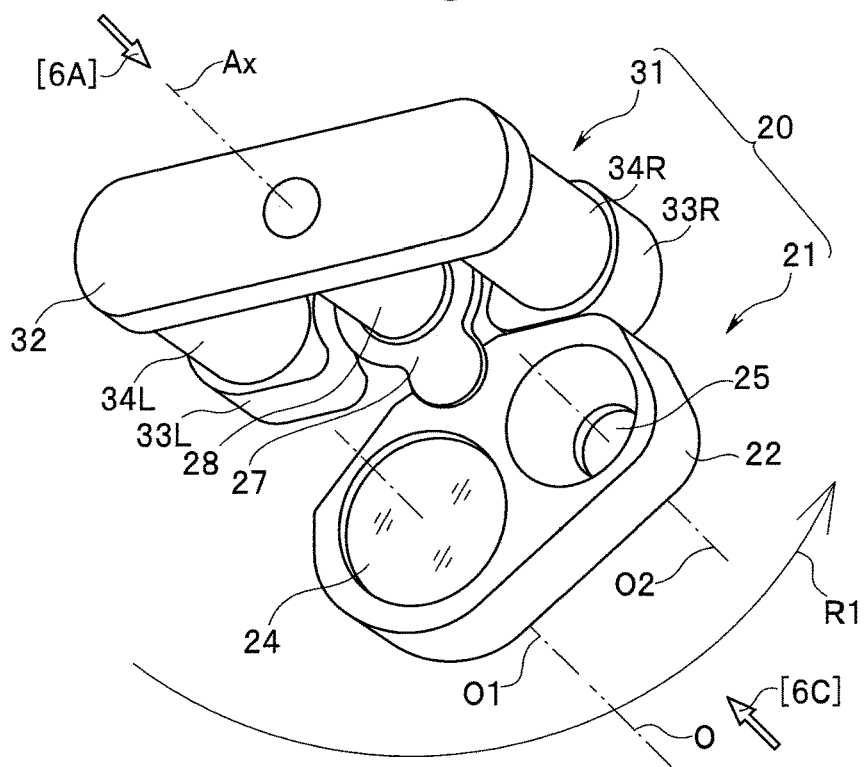
FIG. 2 is a perspective view illustrating an appearance of the optical apparatus including the movable optical unit of the first embodiment of the present invention (a state in which a holding frame is at a first position)
Figure 3:
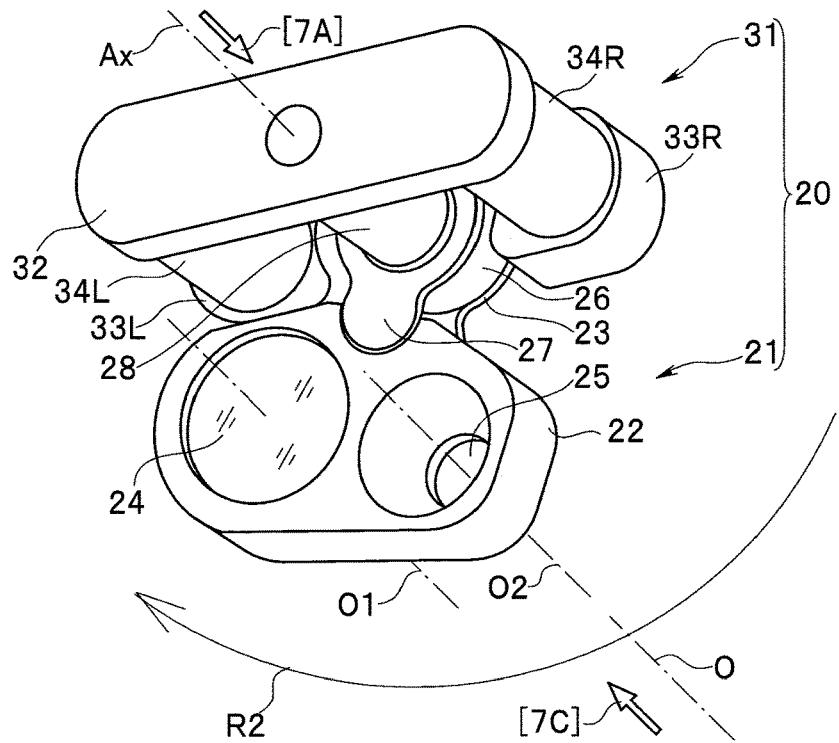
FIG. 3 is a perspective view illustrating an appearance of the optical apparatus including the movable optical unit of the first embodiment of the present invention (a state in which the holding frame is at a second position)
Figure 4:
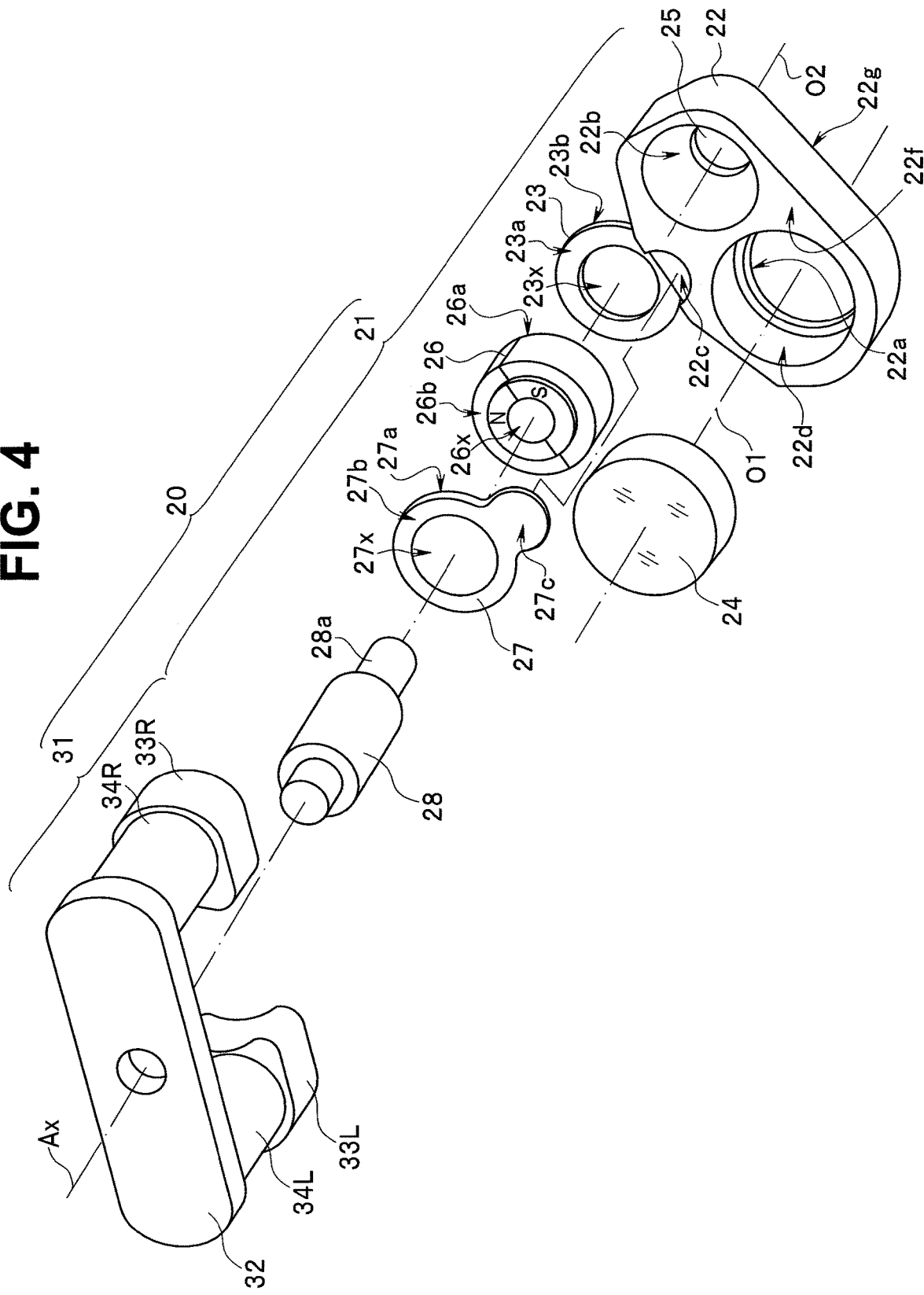
FIG. 4 is an exploded perspective view of the optical apparatus including the movable optical unit of the first embodiment of the present invention.
Figure 5:
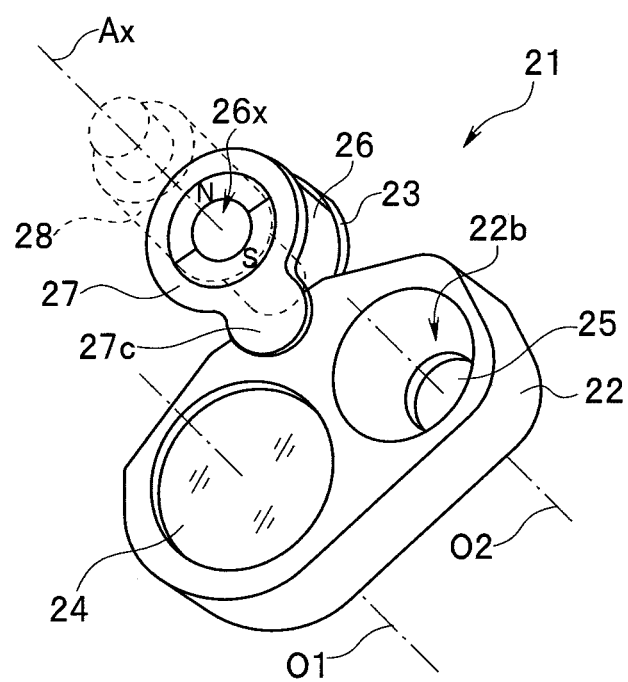
FIG. 5 is a perspective view illustrating an appearance of the movable optical unit of the first embodiment of the present invention.

Next, a configuration of the movable optical unit of the first embodiment of the present invention and a configuration of the optical apparatus including the movable optical unit will be described below with reference to FIGS. 2 to 7. FIGS. 2 and 3 are perspective views illustrating the appearance of the optical apparatus including the movable optical unit of the first embodiment of the present invention. FIG. 2 illustrates a state in which a holding frame of the movable optical unit is at a first position. FIG. 3 illustrates a state in which the holding frame of the movable optical unit is at a second position. FIG. 4 is an exploded perspective view of the optical apparatus including the movable optical unit of the first embodiment of the present invention. FIG. 5 is a perspective view illustrating the appearance of the movable optical unit of the first embodiment of the present invention.

Figure 6:
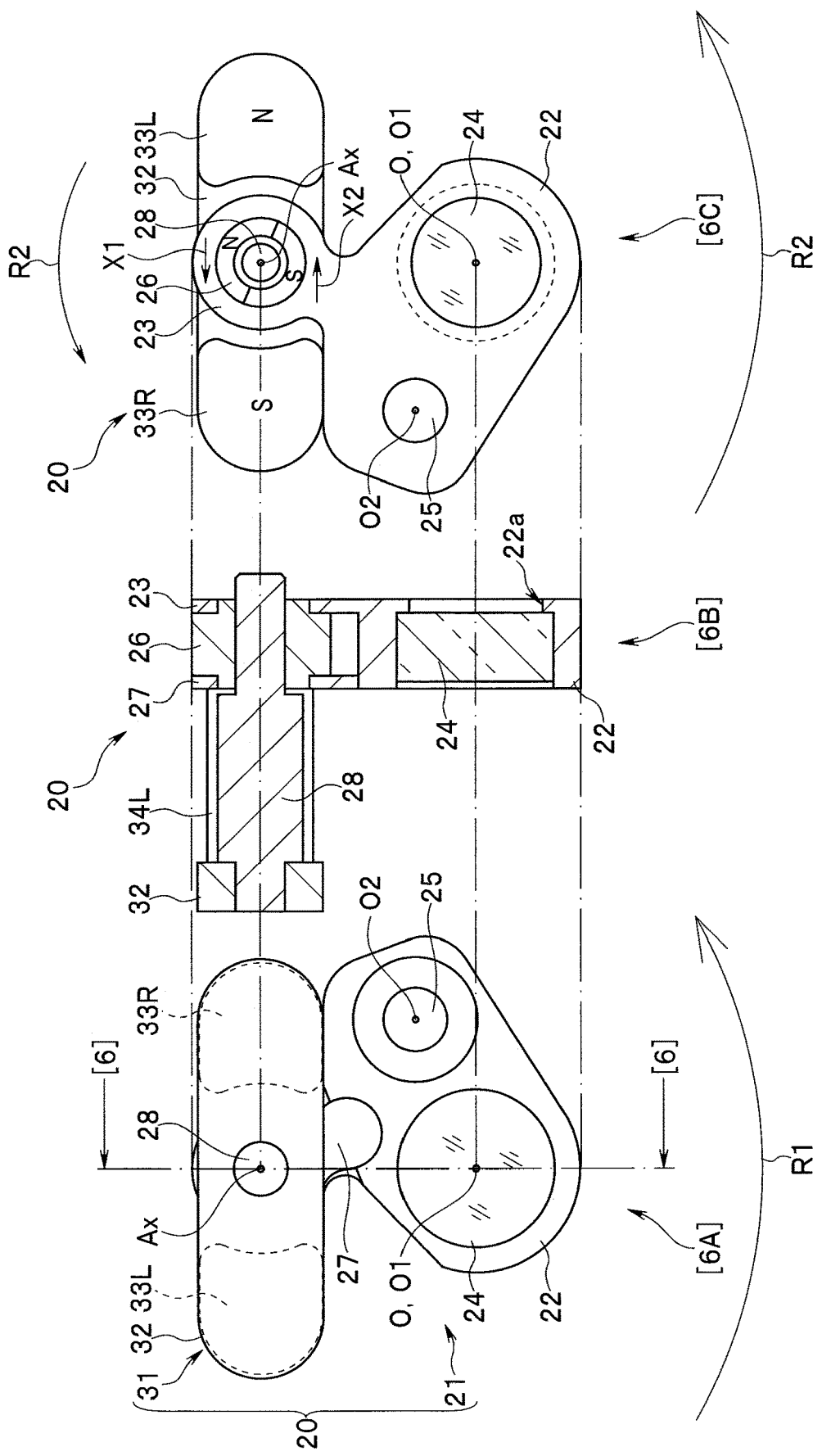
FIG. 6 is a diagram illustrating a plane and a cross section of the optical apparatus including the movable optical unit of the first embodiment of the present invention, and illustrating an operation of the optical apparatus (the state in which the holding frame is at the first position)
Figure 7:
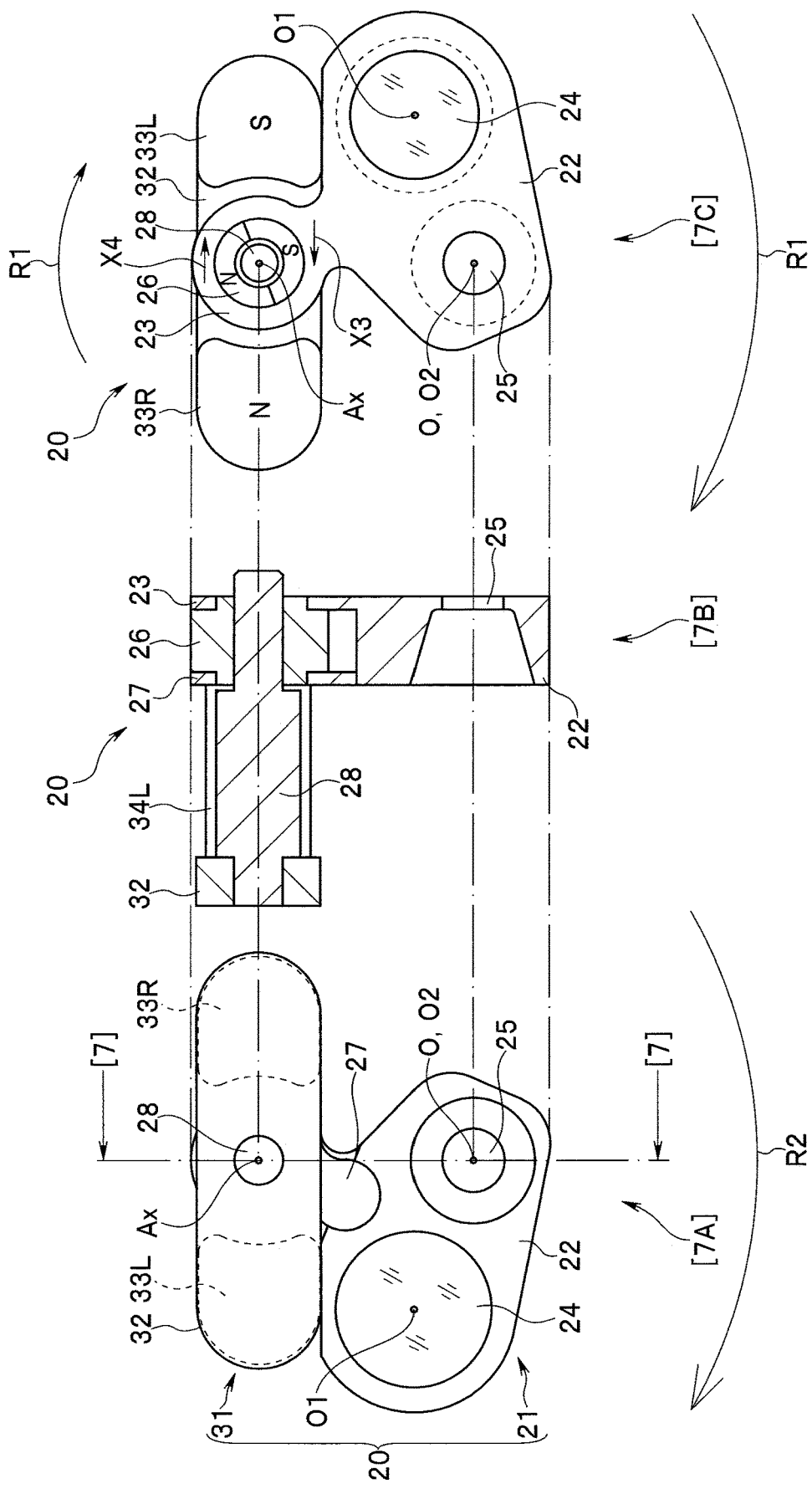
FIG. 7 is a diagram illustrating a plane and a cross section of the optical apparatus including the movable optical unit of the first embodiment of the present invention, and illustrating an operation of the optical apparatus (the state in which the holding frame is at the second position)

FIGS. 6 and 7 are diagrams illustrating a plane and a cross section of the optical apparatus including the movable optical unit of the first embodiment of the present invention, and illustrating an operation of the optical apparatus. FIG. 6 illustrates a state in which the holding frame of the movable optical unit is at the first position. FIG. 7 illustrates a state in which the holding frame of the movable optical unit is at the second position. Note that a reference sign [6A] in FIG. 6 indicates a plane viewed from the direction of an arrow [6A] in FIG. 2. A reference sign [6B] in FIG. 6 indicates a cross section taken along a line [6]-[6] in FIG. 6. A reference sign [6C] in FIG. 6 indicates a plane viewed from the direction of an arrow [6C] in FIG. 2. A reference sign [7A] in FIG. 7 indicates a plane viewed from the direction of an arrow [7A] in FIG. 3. A reference sign [7B] in FIG. 7 indicates a cross section taken alone a line [7]-[7] in FIG. 7. A reference sign [7C] in FIG. 7 indicates a plane viewed from the direction of an arrow [7C] in FIG. 3.

Note that in the following description, for example, with respect to each constituent member in an optical apparatus 20 illustrated in FIG. 4, a surface on a side illustrated in FIG. 4 is referred to as a front surface. In addition, a surface on a side not illustrated in FIG. 4 is referred to as a rear surface.

A movable optical unit 21 of the first embodiment of the present invention is an optical unit configured to be rotatable around an axis by an electromagnetic drive unit 31 (electromagnet). The movable optical unit 21 of the present embodiment is a configuration unit included in an optical apparatus including a mechanism that makes optical characteristics of an observation optical system variable by inserting or retracting an optical member into or from an optical path of the observation optical system in, for example, an endoscope apparatus.

That is, the optical apparatus 20 is configured of the movable optical unit 21 of the first embodiment of the present invention and the electromagnetic drive unit 31.

The movable optical unit 21 of the present embodiment includes a fixed shaft 28 (illustrated by a dotted line in FIG. 5), a bearing 26 (not illustrated in FIG. 2), a holding frame 22, and a pair of arm members 23 and 27 (reference sign 23 is not illustrated in FIG. 2).

The fixed shaft 28 is a shaft member that serves as a rotation center of the holding frame 22. The fixed shaft 28 is pivotally supported by a fixed portion (not illustrated) of the optical apparatus 20. For example, one end of the fixed shaft 28 in the present embodiment is fixed to a part (a yoke 32 to be described later) of the electromagnetic drive unit 31, and the other end thereof is fixed to an apparatus main body (for example, such as a distal end portion main body of the endoscope apparatus; not illustrated) to which the optical apparatus 20 is applied. In this case, the fixed shall 28 is inserted through the bearing 26 as will be described later. Note that a reference sign Ax illustrated in FIGS. 2 to 7 indicates a central axis of the fixed shaft 28.

The bearing 26 is made of a permanent magnet having an insertion hole 26x (see FIGS. 4 and 5) and formed in a substantially annular shape. The fixed shaft 28 is inserted through the insertion hole 26x of the bearing 26. In this case, the bearing 26 has two magnetic poles polarized in a direction orthogonal to a long axis of the fixed shaft 28 (see FIGS. 4 and 5). In addition, reference signs S and N on the bearing 26 illustrated by the reference sign [6C] in FIGS. 4 and 6 and the reference sign [7C] in FIG. 7 indicate two magnetic poles of the bearing 26. In the present embodiment, the S pole and the N pole of the bearing 26 are arranged as illustrated in the drawing.

The holding frame 22 is a member that holds the optical member. The holding frame 22 is preferably made of a non-magnetic material such as austenitic stainless steel or brass. The non-magnetic material is used as the holding frame 22 in this manner in consideration of the influence of the bearing 26 and the electromagnetic drive unit 31 on the magnetic field. In the present embodiment, the holding frame 22 is integrally formed of a non-magnetic material by cutting work or the like.

Here, the holding frame 22 in the present embodiment is configured to hold a plurality of optical members including one optical lens 24 as a first optical member and one aperture member 25 as a second optical member. The optical lens 24 is formed of a transparent member having predetermined optical characteristics. As the optical lens 24, to be specific, for example, various optical lenses, parallel flat glass, or the like is applied. The aperture member 25 is an opening member that adjusts the amount of light passing therethrough. These optical members (24, 25) have a function of passing a light flux from an observation object and guiding the light flux to an observation optical system of a predetermined apparatus (for example, an endoscope apparatus) to which the optical apparatus 20 is applied.

For this purpose, the holding frame 22 is formed with openings 22a and 22b (see FIGS. 4, 5, and 6) for holding the optical members (24, 25) and passing the light flux therethrough. Here, a distance between the center position of the opening 22a and the central axis Ax of the fixed shaft 28 and a distance between the center position of an opening 22d and the central axis Ax of the fixed shaft 28 are set to be substantially equal.

As will be described later in detail, with this setting, when the holding frame 22 is rotated around the fixed shaft 28 (in the directions indicated by arrows R1 and R2 in FIGS. 2 and 3), the center position of the opening 22a (the optical lens 24) and the center position of the opening 22b (the aperture member 25) are moved on concentric circles so that they are alternatively arranged at an identical position (a position coinciding with an optical axis O of the observation optical system).

Nate that reference signs O1 and O2 illustrated in FIGS. 2 to 7 indicate the central axes of the optical members (24, 25). In addition, the reference sign O indicates an optical axis of an observation optical system of a predetermined apparatus (for example, an endoscope apparatus) to which the optical apparatus 20 is applied (details will be described later). The central axes O1 and O2 of the optical members (24, 25) are set substantially parallel to the central axis Ax of the fixed shaft 28.

The optical lens 24 held by the holding frame 22 is bonded in a state of being arranged inside the opening 22d. In this manner, when the optical lens 24 is bonded in the opening 22d of the holding frame 22, the optical lens 24 is formed while not protruding to the outside from the opening 22d of the holding frame 22 in a direction of the central axis O1. In other words, the optical lens 24 is completely housed inside the opening 22d of the holding frame 22. Therefore, the maximum thickness of the optical lens 24 in the direction of the central axis O1 is formed thinner than the maximum thickness of the holding frame 22 in the same direction.

Further, the holding frame 22 has the pair of arm members 23 and 27 extending outward. In this case, the pair of arm members 23 and 27 extend outward from the holding frame 22 in a direction substantially orthogonal to the respective central axes (O1, O2) of the optical members (24, 25) held by the holding frame 22.

In the pair of arm members 23 and 27 in the present embodiment, at least one arm member 23 is formed integrally with the holding frame 22. In addition, the other one arm member 27 is formed separately from the holding frame 22. Each of the pair of arm members 23 and 27 is formed in a thin-plate shape.

Hereinafter, the arm member 23 formed integrally with the holding frame 22 is referred to as the first arm member 23. In addition, the arm member 27 formed separately from the holding frame 22 is hereinafter referred to as the second arm member 27.

In this case, as illustrated in FIG. 4, the first arm member 23 is formed to be flush with a rear surface 22g of the holding frame 22. The second arm member 27 is arranged to be flush with a front surface 22f of the holding frame 22. The first arm member 23 and the second arm member 27 are arranged to face each other at a predetermined space in a direction along the central axis Ax of the fixed shaft 28.

The second arm member 27 is formed to have a projecting portion 27c (see FIG. 4) projecting radially outward. The projecting portion 27c is adhesively bonded to a bonding portion 22c formed in a part of the holding frame 22 using, for example, an adhesive or the like.

The bonding portion 22c is a flat plane having a shape substantially similar to the shape of the vicinity of a part (tip portion) of the projecting portion 27c of the second arm member 27 and having a predetermined area. Further, the bonding portion 22c has a predetermined step lower than the front surface 22f of the holding frame 22. The step of the bonding portion 22c is set to have a height corresponding to a plate thickness of the second arm member 27.

With such a configuration, the projecting portion 27c of the second arm member 27 is adhesively bonded to the bonding portion 22c of the front surface 22f of the holding frame 22, whereby the holding frame 22 and the second arm member 27 are integrated. At this time, the pair of arm members 23 and 27 are arranged at positions facing each other.

The pair of arm members 23 and 27 each sandwich the bearing 26 in a direction of the central axis Ax of the fixed shaft 28. In this case, a front surface 23a of the first arm member 23 and a rear surface 26a of the bearing 26 illustrated in FIG. 4 are adhesively bonded to each other with an adhesive or the like. Further, a rear surface 27a of the second arm member 27 and a front surface 26b of the bearing 26 illustrated in FIG. 4 are adhesively bonded to each other with an adhesive or the like.

In addition, an outer peripheral edge portion of the rear surface 26a of the bearing 26 is formed to have a lower step at a portion to which the front surface 23a of the first arm member 23 is adhesively bonded. This step is set to a height corresponding to the plate thickness of the first arm member 23. Similarly, an outer peripheral edge portion of the front surface 26b of the bearing 26 is formed to have a lower step at a portion to which the rear surface 27a of the second arm member 27 is adhesively bonded. This step is set to a height corresponding to the plate thickness of the second arm member 27.

Further, a portion of each of the first arm member 23 and the second arm member 27 where the bearing 26 is arranged is formed in a shape substantially similar to the outer diameter of the bearing 26.

With this configuration, when the front surface 23a of the first arm member 23 is adhesively bonded to the rear surface 26a of the bearing 26, the rear surface 26a of the bearing 26 and the rear surface 23b of the first arm member 23 are formed to be substantially flush with each other. Similarly, when the rear surface 27a of the second arm member 27 is adhesively bonded to the front surface 26b of the bearing 26, the front surface 26b of the bearing 26 and the front surface 27b of the second arm member 27 are formed to be substantially flush with each other.

Then, at this time, each of the predetermined surfaces of the pair of arm members 23 and 27 is adhesively bonded in a state of being engaged with the lower step provided on each of the front surface 26b and the rear surface 26a of the bearing 26. Thus, this configuration allows the bearing 26 to be accurately positioned with respect to the pair of arm members 23 and 27.

Further, insertion holes 23x and 27x (see FIG. 4) having substantially the same diameters as the front surface 26b and the rear surface 26a of the bearing 26 are formed in the pair of arm members 23 and 27. These insertion holes 23x and 27x are respectively arranged at positions corresponding to the front surface 26b and the rear surface 26a of the bearing 26 when the bearing 26 is adhesively bonded in a state of being sandwiched by the pair of arm members 23 and 27.

With this configuration, when the bearing 26 is adhesively bonded in a state of being sandwiched between the pair of arm members 23 and 27, a communicating insertion hole is formed by the insertion hole 26x of the bearing 26 and the insertion holes 23x and 27x of the pair of arm members 23 and 27. One end portion 28a of the fixed shaft 28 is inserted into the insertion hole. With this configuration, the bearing 26 and the pair of arm members 23 and 27 are integrally rotatable around the fixed shaft 28 (in the directions indicated by the arrows R1 and R2 in FIGS. 2 and 3). Accordingly, the holding frame 22 is also rotatable around the fixed shaft 28.

The electromagnetic drive unit 31 is configured by the yoke 32, yokes 33R, and 33L, and a pair of coils 34R and 34L. The pair of coils 34R and 34L are formed in a form of winding wires with respect to the pair of yokes 33R and 33L, respectively. The pair of coils 34R and 34L are electrically connected to each other by a connection line (not illustrated). In addition, the pair of coils 34R and 34L are electrically connected to a control section (not illustrated) (the main body portion 3 of a predetermined apparatus (for example, the endoscope apparatus 1) to which the optical apparatus 20 is applied). Thus, the electromagnetic drive unit 31 is controlled by the control section (not illustrated) for the direction of energization to the pair of coils 34R and 34L and to turn on and off the energization.

As described above, the pair of coils 34R and 34L are provided on the pair of yokes 33R and 33L, respectively. The pair of yokes 33R and 33L are connected by the yoke 32. Thus, the pair of yokes 33R and 33L are configured as a pair of magnetic bodies.

With such a configuration, the electromagnetic drive unit 31 functions as a substantially U-shaped electromagnet as a whole. That is, the electromagnetic drive unit 31 is configured as an electromagnet that acts on the magnetic poles of the bearing 26.

For example, when the pair of coils 34R and 34L are energized, the yokes 32, 33R and 33L are magnetized. Further, when the direction of energization to the pair of coils 34R and 34L is changed, the polarity is switched. When the energization to the pair of coils 34R and 34L is turned off, the magnetic force disappears. At this time, the magnetic force of the bearing 26 acts on the yokes 33R and 33L which are magnetic bodies (details will be described later).

As described above, a distal end of the fixed shaft 28 is fixed to the yoke 32. The fixed shaft 28 is inserted into the bearing 26 and the pair of arm members 23 and 27 that are rotatable around the fixed shaft 28. Thus, the bearing 26 is rotatable around the fixed shaft 28 in forward and reverse directions (R1 and R2 directions). Therefore, the holding frame 22 integrated with the bearing 26 also rotates around the fixed shaft 28.

Note that as the configuration of the electromagnetic drive unit 31 itself, a general configuration formed by using an existing known technique is adopted. Therefore, further detailed description of the electromagnetic drive unit 31 will be omitted.

The operation of the optical apparatus 20 including the movable optical unit 21 of the present embodiment configured as described above will be briefly described below mainly with reference to FIGS. 6 and 7.

First, in a state in which energization to the pair of coils 34R and 34L of the electromagnetic drive unit 31 is turned off, the magnetic force of the bearing 26 (permanent magnet) acts on the pair of yokes 33R and 33L (magnetic body).

For example, when the magnetic force of the bearing 26 acts on the pair of yokes 33R and 33L while the pair of coils 34R and 34L are not energized, the bearing 26 rotates around the fixed shaft 28. At the same time, the holding frame 22 also rotates around the fixed shaft 28.

To be specific, for example, it is assumed that the bearing 26 and the holding frame 22 are rotated around the fixed shaft 28 in the direction of the arrow R1 as indicated by the reference sign [6A] in FIG. 6.

Then, after the holding frame 22 is rotated around the fixed shaft 28 by a predetermined amount of rotation, the rotation of the holding frame 22 is restricted by one yoke 33R.

To be specific, for example, a part of the side surface of the holding frame 22 comes into contact with a part of the side surface of one of the pair of yokes 33R and 33L. Thus, the rotation of the holding frame 22 around the fixed shaft 28 is restricted. As such, the rotation of the holding frame 22 is stopped at the position illustrated in FIG. 6.

Even in this state, since the magnetic force of the bearing 26 continues to act on the pair of yokes 33R and 33L, the holding frame 22 is held at the predetermined position. At this time, it is assumed that the S pole and the N pole of the bearing 26 are arranged, for example, as indicated by the reference sign [6C] in FIG. 6.

Note that at this time, it is assumed that the holding frame 22 is located at a position where the central axis O1 of the optical lens 24 substantially coincides with the optical axis O of the observation optical system (not illustrated) of a predetermined apparatus (for example, the endoscope apparatus 1; not illustrated) to which the optical apparatus 20 is applied. The position of the holding frame 22 at this time (the position illustrated in FIGS. 2 and 6) is referred to as a first position.

That is, when the holding frame 22 is at the first position, the optical lens 24 held by the holding frame 22 is positioned on the optical axis O of the observation optical system (not illustrated). Further, at this time, the central axis O1 of the optical lens 24 substantially coincides with the optical axis O of the observation optical systems. The state in which the holding frame 22 is at the first position is maintained by the action of the magnetic force of the bearing 26.

When the optical apparatus 20 is in this state (the state illustrated in FIGS. 2 and 6), the pair of coils 34R and 34L of the electromagnetic drive unit 31 are energized in a predetermined direction. By this energization, for example, one yoke 33R is magnetized to the S pole and the other yoke 33L is magnetized to the N pole as indicated by the reference sign [6C] in FIG. 6.

Then, when the magnetic poles of the electromagnetic drive unit 31 act on the bearing 26, the N pole of the bearing 26 and the S pole of the one yoke 33R attract each other (see reference sign X1), and the S pole of the bearing 26 and the N pole of the other yoke 33L attract each other (see reference sign X2). At the same time, the S pole of the bearing 26 and the S pole of the one yoke 33R repel each other (see reference sign X2), and the N pole of the bearing 26 and the N pole of the other yoke 33L repel each other (see reference sign X1).

As a result, the bearing 26 rotates in the direction of the arrow R2 indicated by the reference sign [6C] in FIG. 6. Accordingly, the holding frame 22 also rotates in the same direction (the direction of arrow R2). The holding frame 22 then shifts to the position illustrated in FIGS. 3 and 7.

When shifting to the state illustrated in FIGS. 3 and 7, a part of the holding frame 22 comes into contact with a part of the side surface of the other yoke 33L, and the rotation of the holding frame 22 in the direction of the arrow R2 (see reference sign [7A] in FIG. 7) is restricted. After shifting to the state illustrated in FIGS. 3 and 7 in this way, the energization to the pair of coils 34R and 34L is turned off. Thus, the pair of yokes 33R and 33L are demagnetized. However, at this time, since the magnetic force of the bearing 26 acts on the pair of yokes 33R and 33L, the state illustrated in FIGS. 3 and 7 is maintained even when the energization to the pair of coils 34R and 34L is turned off.

At this time, the holding frame 22 is arranged at a position where the central axis O2 of the aperture member 25 substantially coincides with the optical axis O of the observation optical system (not illustrated) of a predetermined apparatus (for example, the endoscope apparatus 1; not illustrated) to which the optical apparatus 20 is applied. The position of the holding frame 22 at this time (the position illustrated in FIGS. 3 and 7) is referred to as a second position.

That is, when the holding frame 22 is at the second position, the aperture member 25 held by the holding frame 22 is positioned on the optical axis O of the observation optical system (not illustrated). Further, at this time, the central axis O2 of the aperture member 25 substantially coincides with the optical axis O of the observation optical system. The state in which the holding frame 22 is at the second position is maintained by the action of the magnetic force of the bearing 26.

Subsequently, when the optical apparatus 20 is in this state (the state illustrated in FIGS. 3 and 7), the pair of coils 34R and 34L of the electromagnetic drive unit 31 are energized in a predetermined direction (the direction opposite to the direction in the above-described state). Then, at this time, as indicated by the reference sign [7C] in FIG. 7, the one yoke 33R is magnetized to the N pole, and the other yoke 33L is magnetized to the S pole.

Then, when the magnetic poles of the electromagnetic drive unit 31 act on the bearing 26, the S pole of the bearing 26 and the N pole of the one yoke 33R are attracted to each other (see reference sign X3), and the N pole of the bearing 26 and the S pole of the other yoke 33L are attracted to each other (see reference sign X4). At the same time, the N pole of the bearing 26 and the N pole of the one yoke 33R repel each other (see reference sign X4), and the S pole of the bearing 26 and the S pole of the other yoke 33L repel each other (see reference sign X3).

As a result, the bearing 26 rotates in the direction of the arrow R1 indicated by the reference sign [7C] in FIG. 7. Accordingly, the holding frame 22 also rotates in the same direction (the direction of arrow R1). The holding frame 22 then shifts to the position illustrated in FIGS. 2 and 6.

When shifting to the state illustrated in FIGS. 2 and 6, a part of the holding frame 22 comes into contact with a part of the side surface of the other yoke 33R, and the rotation of the holding frame 22 in the direction of the arrow R1 (see reference sign [6A] in FIG. 6) is restricted. After shifting to the state illustrated in FIGS. 2 and 6 in this way, the energization to the pair of coils 34R and 34L is turned off. Thus, the pair of yokes 33R and 33L are demagnetized. However, at this time, since the magnetic force of the bearing 26 acts on the pair of yokes 33R and 33L, the state illustrated in FIGS. 2 and 6 is maintained even when the energization to the pair of coils 34R and 34L is turned off.

At this time, the holding frame 22 is arranged at the first position where the central axis O1 of the optical member 24 substantially coincides with the optical axis O of the observation optical system (not illustrated) of a predetermined apparatus (for example, the endoscope apparatus 1; not illustrated) to which the optical apparatus 20 is applied, and the first position is maintained.

As described above, according to the above first embodiment, the movable optical unit 21 configured to be rotatable around the fixed shaft 28 by the electromagnet (electromagnetic drive unit 31) includes the fixed shaft 28, the bearing 26 through which the fixed shaft 28 is inserted and which is made of a permanent magnet having two magnetic poles polarized in the direction orthogonal to the direction along the central axis Ax of the fixed shaft 28, the holding frame 22 provided to be rotatable around the fixed shaft 28 and holding the optical members (optical lens member 24 and aperture member 25), and the pair of arm members 23 and 27 extending outward from the holding frame 22, the pair of arm members 23 and 27 are configured to sandwich the bearing 26 in the direction along the central axis Ax of the fixed shaft 28.

As described above, the movable optical unit 21 includes the holding frame 22 that is a movable member for holding a relatively heavy optical member (optical lens 24), and has a configuration in which the bearing 26 is bonded in a state of being sandwiched between the pair of arm members 23 and 27. With this configuration, in the movable optical unit 21 of the present embodiment, the bearing 26 and the holding frame 22 are integrally and firmly fixed by the pair of arm members 23 and 27.

Therefore, for example, even when a predetermined stress is applied to the bonding portion between the bearing 26 and the holding frame 22 caused by an impact from the outside or the like on the optical apparatus 20, it is possible to secure higher bonding strength. Therefore, the required impact resistance can be obtained.

In addition, since the maximum thickness of the optical lens 24 in the direction of the central axis O1 is made to be thinner than the maximum thickness of the holding frame 22 in the same direction, the optical lens 24 held by the holding frame 22 does not protrude from the surface of the holding frame 22 in the direction of the optical axis. That is, the optical lens 24 is completely housed inside the opening 22d of the holding frame 22. With this configuration, when the holding frame 22 rotates, there is no possibility of scratching the surface of the optical lens 24 due to the optical lens 24 coming into contact with other constituent members around the holding frame 22 or the like.

Even when the adhesion area with the bearing 26 is reduced due to the reduction in size of the holding frame 22 itself, a sufficient adhesion area can be secured because it is configured such that the bearing 26 is sandwiched by the pair of arm members 23 and 27 and each of the arm members 23 and 27 is adhesively bonded to the bearing 26. Accordingly, this can secure high bonding strength.

Note that as a configuration example of the holding frame 22 in the above-described first embodiment, a configuration example in which two optical members of one optical lens 24 (first optical member) and one aperture member 25 (second optical member) are held is illustrated. However, the configuration of the holding frame 22 is not limited to this example. For example, as the second optical member, an optical lens having further different optical characteristics may be used instead of the aperture member 25 described above. In addition, the optical member held by the holding frame 22 may hold at least one optical member. Therefore, for example, not only the above-described configuration example of the two optical members but also a configuration in which one optical member is inserted into or retracted from the optical axis may be adopted. In addition, a configuration in which two or more optical members are held by the holding portion and one of the plurality of optical members is appropriately switched to be arranged on the optical axis may be considered.

Further, in the above-described first embodiment, adhesive bonding is exemplified as a bonding means between the pair of arm members 23 and 27 and the bearing 26. However, the present invention is not limited thereto. As another bonding means between the pair of arm members 23 and 27 and the bearing 26, for example, caulking, ultrasonic welding, or the like can be used.

In the first embodiment described above, as an example, the holding frame 22 which is integrally formed of a non-magnetic material by cutting work or the like is described. However, in order to promote the reduction of the manufacturing costs while considering further miniaturization of the apparatus, the above-described configuration alone has limitations. In particular, since components such as a holding frame in the movable optical unit have complicated shapes, the manufacturing cost tends to increase as the size is reduced. Therefore, it is conceivable to form the holding frame in the movable optical unit by using a manufacturing means such as diffusion bonding.

Here, the diffusion bonding is a bonding method in which members are brought into close contact with each other, and pressure is applied to the extent that plastic deformation does not occur as much as possible under a temperature condition equal to or lower than the melting point of the base material, thereby achieving metallic bonding between the bonding surfaces (JIS Z 3001-2).

Figure 8:
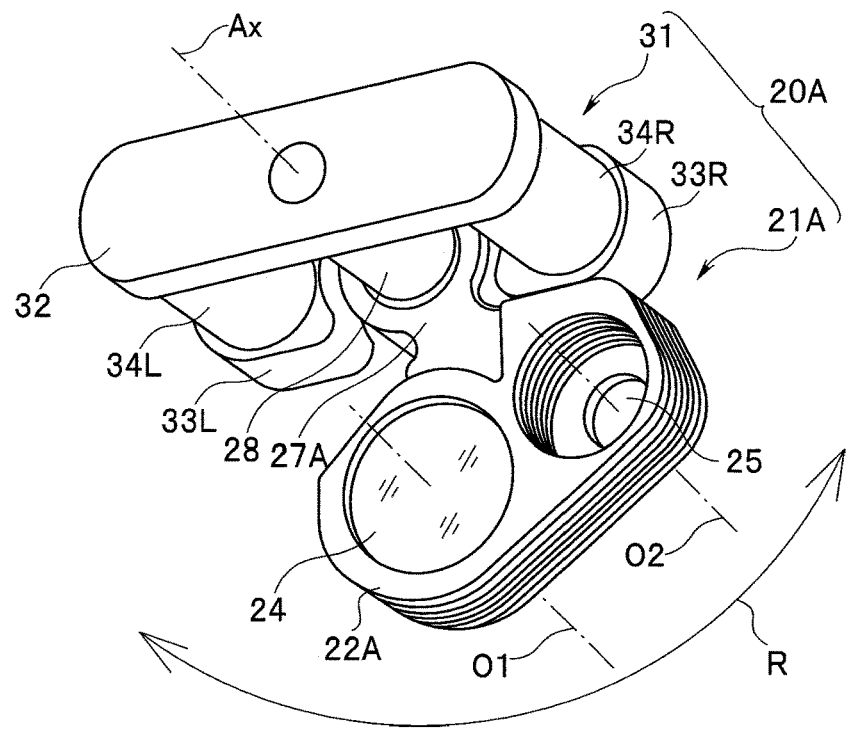
FIG. 8 is a perspective view illustrating an appearance of an optical apparatus including a movable optical unit of a first modification of the first embodiment of the present invention.
Figure 9:
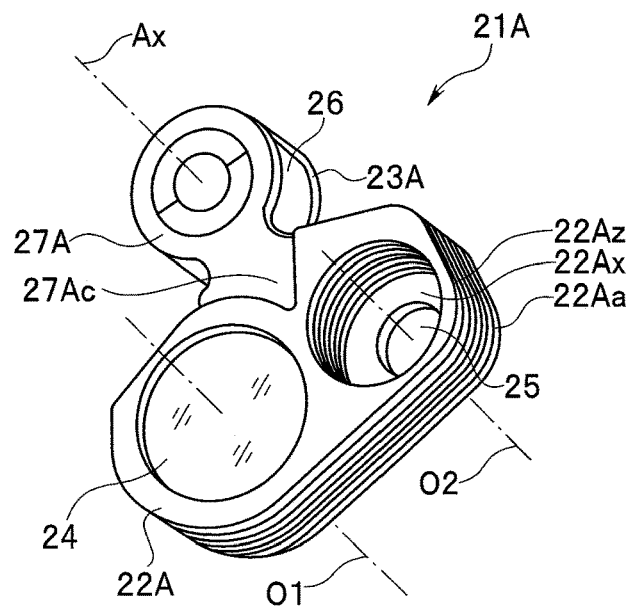
FIG. 9 is a perspective view illustrating an appearance of the movable optical unit of the first modification of FIG. 8.

A first modification of the present embodiment described below is an example in which a holding frame in a movable optical unit is formed by diffusion bonding. FIGS. 8 and 9 are diagrams illustrating a first modification of the movable optical unit according to the first embodiment of the present invention. FIG. 8 is a perspective view illustrating an appearance of an optical apparatus including a movable optical unit of the first modification. FIG. 9 is a perspective view illustrating an appearance of the movable optical unit of the first modification.

As illustrated in the drawing, the configuration of a movable optical unit 21A of the first modification and the basic configuration of an optical apparatus 20A including the movable optical unit 21A are substantially the same as those of the above-described first embodiment. The present modification is different only in that a holding frame 22A is formed by diffusion bonding. Therefore, the same constituent members as those in the above-described first embodiment are denoted by the same reference signs, detailed description thereof will be omitted, and only the configuration of a portion (the holding frame 22A) different from that in the above first embodiment will be described below.

The holding frame 22A in the movable optical unit 21A of the present modification is formed using so-called diffusion bonding. To be specific, the holding frame 22A is formed by, for example, stacking and diffusion-bonding metal (non-magnetic material) thin-plate members in which a plurality of members formed in a predetermined shape by etching is arranged side by side.

In this case, a first arm member 23A is integrally formed with the holding frame 22A. The first arm member 23A is formed integrally with the holding frame 22A by a thin-plate member 22Aa (see FIG. 9) arranged on the rear-most surface side among the plurality of thin-plate members configuring the holding frame 22A. In addition, the aperture member 25 is formed integrally with the holding frame 22A by a single thin-plate member 22Ax (see FIG. 9) arranged in the middle of the plurality of thin-plate members configuring the holding frame 22A.

Further, a portion for holding the optical lens 24 in the holding frame 22A is formed of a plurality of layers. At this time, the thickness of the entire holding frame 22A is thicker than the thickness of the central axis O1 direction of the optical lens 24.

In addition, a second arm member 27A is formed to have a projecting portion 27Ac (see FIG. 9) projecting radially outward. A rear surface of the projecting portion 27Ac is adhesively bonded to a bonding portion formed in a part of a front surface of the holding frame side 22A using an adhesive or the like.

Nate that the bonding portion of the holding frame 22A is formed by cutting out a part of the front-most thin-plate member 22Az (see FIG. 9) of the holding frame 22A. In other words, the step of the bonding portion of the holding frame 22A corresponds to the thickness of one sheet of the thin-plate member. Further, the plate thickness of the second arm member 27A is set to be substantially equal to the thickness of the step of the bonding portion, that is, the plate thickness of the thin-plate member 22Az on the front-most surface of the holding frame 22A. Then, the projecting portion 27Ac of the second arm member 27A is adhesively bonded to the bonding portion of the holding frame 22A, and the holding frame 22A and the second arm member 27A are integrated. At this time, the front surfaces of the second arm member 27A and the holding frame 22A are substantially flush with each other. Further, the first arm member 23A and the second arm member 27A are arranged to face each other. Other configurations are substantially the same as those of the first embodiment described above. The operation of the optical apparatus 20A including the movable optical unit 21A of the first modification configured as described above is exactly the same as that of the first embodiment described above.

As described above, according to the first modification, it is possible to obtain the same effects as those of the first embodiment. In addition, in the first modification, since the holding frame 22A is formed using diffusion bonding, various effects as described below can be further obtained.

First, by using diffusion bonding in combination with fine shape processing by etching, the holding frame 22A having a complicated shape can be formed with high accuracy and at low cost. Further, the holding frame 22A can be reduced in size and weight, and at the same time, necessary and sufficient strength can be secured.

For example, the first arm member 23A can be formed integrally with the holding frame 22A with high accuracy. Further, since the aperture member 25 can be formed of a single thin plate, the aperture member 25 can be formed thinner. Since the aperture member 25 can be formed to be thin in this way, it is possible to suppress a flare, a ghost, and the like that may occur due to the structure of the aperture member 25.

On the other hand, by forming the portion for holding the optical lens 24 with a plurality of layers, the relatively heavy optical lens 24 can be more firmly fixed and held by the holding frame 22A. At the same time, by forming the thickness of the holding frame 22A thicker than the thickness of the optical lens 24 in the direction of the central axis O1, the optical lens 24 can be arranged in the holding frame 22A without protruding outward from the holding frame 22A. Accordingly, when the holding frame 22A is rotated, it is possible to reliably prevent the optical lens 24 from coming into contact with other constituent members around the holding frame 22A.

Figure 10:
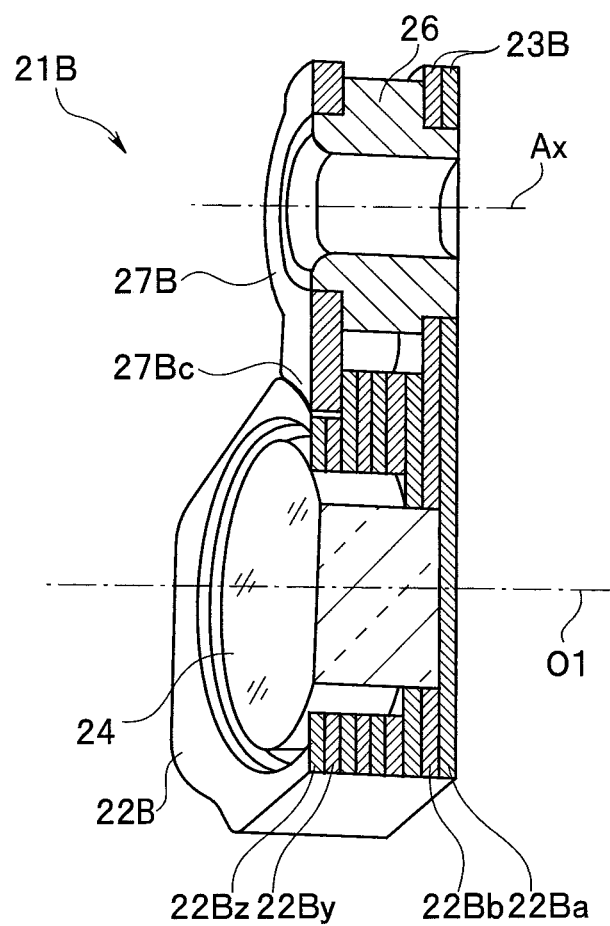
FIG. 10 is a partial cross-sectional perspective view of a movable optical unit of a second modification of the first embodiment of the present invention.

Next, a second modification of the present embodiment will be described. A movable optical unit of the second modification of the present embodiment is another example of the case where a holding frame is formed using diffusion bonding, similarly to the above-described first modification. FIG. 10 is a diagram illustrating the second modification of the movable optical unit of the first embodiment of the present invention. Specifically, FIG. 10 is a partial cross-sectional perspective view of the movable optical unit of the second modification.

As illustrated in the drawing, the basic configuration of a movable optical unit 21B of the second modification is substantially the same as that of the first embodiment and the first modification described above. In this modification, a holding frame 22B is formed by diffusion bonding, and only the configurations of a pair of arm members 23B and 27B and the holding frame 22B are different. Therefore, the same constituent members as those of the first embodiment and the first modification described above are denoted by the same reference signs and detailed description thereof will be omitted, and only the configurations of portions different from those of the first embodiment and the first modification described above will be described below.

In this modification, the first arm member 23B is formed integrally with the frame portion by two sheet of thin-plate members 22Ba and 22Bb (see FIG. 10) arranged on the rear-most surface side of the holding frame 22B. Further, the second arm member 27B is formed to have the same plate thickness as two thin-plate members 22Bz and 22By (see FIG. 10) arranged on the front-most surface side of the holding frame 22B.

Therefore, the bonding portion of the holding frame 22B is formed by cutting out a part of the front-most thin-plate members 22Bz and 22By (see FIG. 10) of the holding frame 22B. In other words, the step of the bonding portion of the holding frame 22B corresponds to the thickness of two sheets of thin-plate members. Further, the plate thickness of the second arm member 27B is set to be substantially equal to the step of the bonding portion, that is, the plate thickness of the two sheets of thin-plate members 22Bz and 22By on the front surface side of the holding frame 22B. Then, a projecting portion 27Bc of the second arm member 27B is adhesively bonded to the bonding portion of the holding frame 22B, and the holding frame 22B and the second arm member 27B are integrated. At this time, the front surfaces of the second arm member 27B and the holding frame 22B are substantially flush with each other. Further, the first arm member 23B and the second arm member 27B are arranged to face each other. Other configurations are substantially the same as those of the first embodiment and the first modification described above. The operation of the optical apparatus (not illustrated) including the movable optical unit 21B of the second modification configured as described above is exactly the same as those of the first embodiment and the first modification described above.

As described above, according to the second modification, the same effects as those of the first embodiment and the first modification described above can be obtained. Further, in the second modification, since the pair of arm members 23B and 27B are formed to have thicknesses equivalent to those of the two sheets of thin-plate members, higher strength for holding the bearing 26 can be secured.

Figure 11:
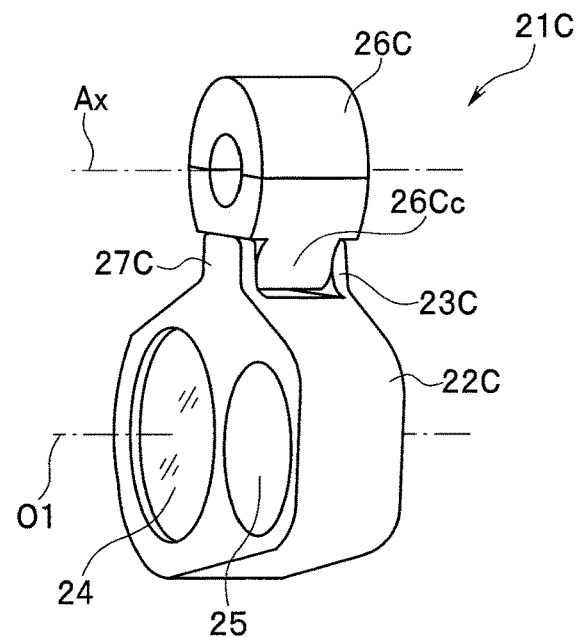
FIG. 11 is a perspective view of a movable optical unit of a third modification of the first embodiment of the present invention.
Figure 12:
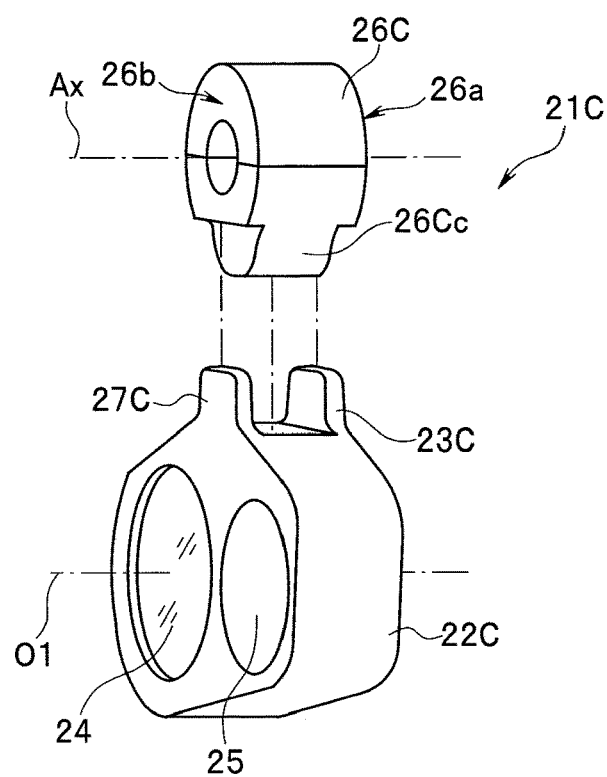
FIG. 12 is an exploded perspective view of the movable optical unit of FIG. 11.

Next, a third modification of the present embodiment will be described. FIGS. 11 and 12 are diagrams illustrating the third modification of the movable optical unit of the first embodiment of the present invention. FIG. 11 is a perspective view of a movable optical unit of the third modification. FIG. 12 is an exploded perspective view illustrating a state in which a holding frame and a bearing are separated from each other (a state before assembly) in the movable optical unit of the third modification. Note that in FIGS. 11 and 12, a fixed shaft is not illustrated.

As illustrated in the drawing, the basic configuration of a movable optical unit 21C of the third modification is substantially the same as that of the first embodiment and the first and second modifications described above. The movable optical unit 21C of the third modification is different from the first embodiment and the first and second modifications described above in that a pair of arm members (a first arm member 23C and a second arm member 27C) are formed integrally with a holding frame 22C. Therefore, the same constituent members as those of the first embodiment and the first and second modifications described above are denoted by the same reference signs and detailed description thereof is omitted, and only configurations of portions different from those of the first embodiment and the first and second modifications described above will be described below.

In this modification, the first arm member 23C is formed integrally with the holding frame 22C while protruding outward from a portion closest to the rear surface of the holding frame 22C. Further, the second arm member 27C is integrally formed with the holding frame 22C while protruding outward from a portion closest to the front surface of the holding frame 22C. Here, the first arm member 23C and the second arm member 27C are formed in a plate shape having predetermined thicknesses. The first arm member 23C and the second arm member 27C are arranged to face each other with a predetermined distance therebetween.

A bearing 26C is formed with a projecting portion 26Cc provided to project radially outward. The thickness of the projecting portion 26Cc in a direction along the central axis Ax of (not illustrated; a fixed shaft inserted into) the bearing 26C is set to be substantially equal to or slightly smaller than the distance between the first arm member 23C and the second arm member 27C. Further, the projecting portion 26Cc is formed to have steps lower than the front surface 26b and the rear surface 26a of the bearing 26C. Therefore, when the projecting portion 26Cc is sandwiched between the first arm member 23C and the second arm member 27C, the rear surface 26a of the bearing 26C and the rear surface of the first arm member 23C are set to be substantially flush with each other. Further, the front surface 26b of the bearing 26C and the front surface of the second arm member 27C are set to be substantially flush with each other.

Then, as illustrated in the drawing, the projecting portion 26Cc of the bearing 26C is sandwiched between the first arm member 23C and the second arm member 27C to be adhesively bonded. This state is illustrated in FIG. 11. Other configurations are substantially the same as those of the first embodiment and the first and second modifications described above. In addition, the operation of the optical apparatus (not illustrated) including the movable optical unit 21C of the third modification configured as described above is exactly the same as those of the first embodiment and the first and second modifications described above.

As described above, according to the third modification, the same effects as those of the first embodiment and the first and second modifications described above can be obtained. Further, in the second modification, since the pair of arm members 23C and 27C are formed integrally with the holding frame 22C, higher strength for holding the bearing 26 can be secured. At the same time, since the pair of arm members 23C and 27C are integrated with the holding frame 22C, it is possible to reduce the number of members, to simplify assembly, and to contribute to cost reduction.

Further, in the configuration of the third modification, the pair of arm members 23C and 27C sandwich only the projecting portion 26Cc that is a part of the front surface 26b and the rear surface 26a of the bearing 26C. Therefore, with this configuration, it is possible to secure wider areas of the side surfaces of the bearing 26C, that is, the surfaces facing the yokes 33R and 33L. Therefore, it is possible to ensure the action of a stronger magnetic force of the bearing 26C.

Note that the configuration of the holding frame 22C in the third modification can also be formed using diffusion bonding in the same manner as in the first and second modifications described above.

In the above first embodiment and the first to third modifications, the optical apparatus applied to the endoscope apparatus 1 and the movable optical unit included in the optical apparatus are exemplified.

However, the optical apparatus and the movable optical unit having such a configuration can be applied to an optical adapter attached to a distal end portion of an insertion portion of an endoscope apparatus in exactly the same manner.

Therefore, a second embodiment of the present invention described below is an example of a case in which an optical apparatus including the movable optical unit of the first embodiment described above is applied to an optical adapter attached to a distal end portion of an insertion portion of an endoscope apparatus.

Note that an endoscope apparatus to which the optical adapter of the present embodiment is attached has substantially the same configuration as the endoscope apparatus 1 described with reference to FIG. 1, but is assumed to have a form in which the optical apparatus including the movable optical unit described in the above first embodiment is excluded. However, in the following description, when the respective constituent members of the endoscope apparatus are indicated, the description will be given using the reference signs assigned to the same constituent members illustrated in FIG. 1.

Figure 13:
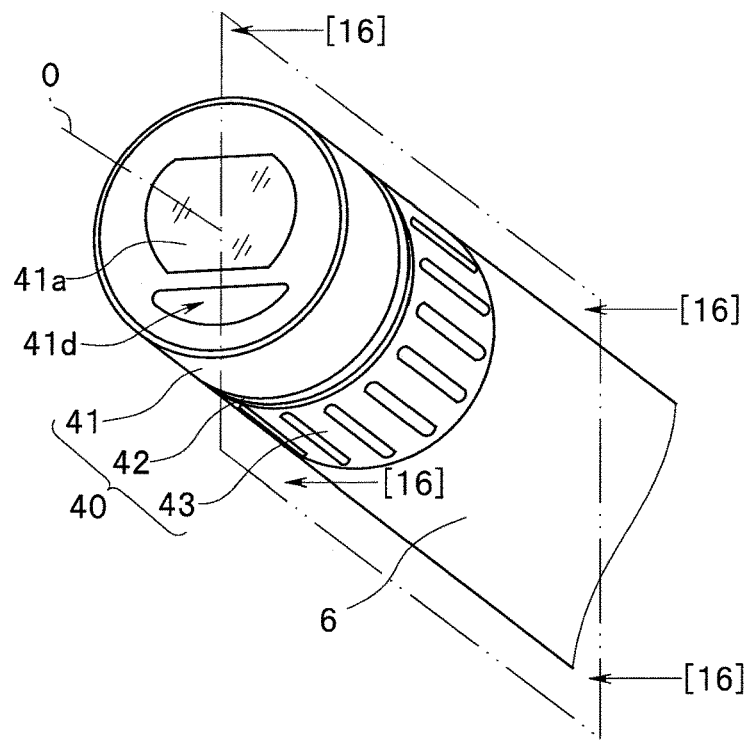
FIG. 13 is a perspective view of an optical adapter of a second embodiment of the present invention.
Figure 14:
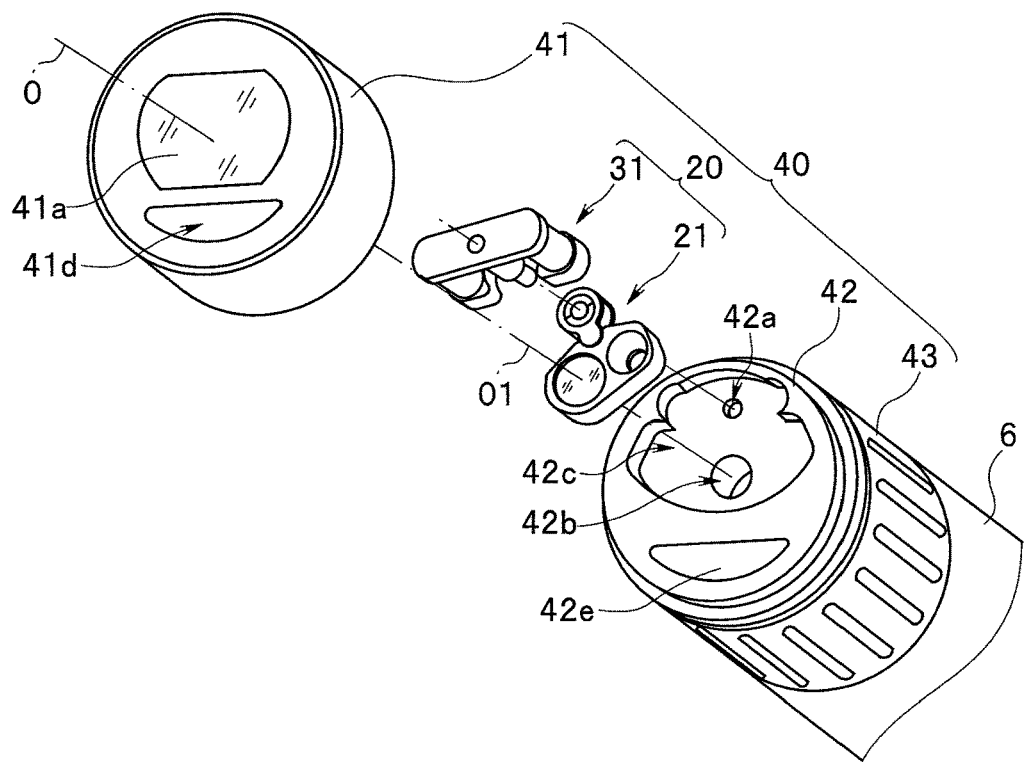
FIG. 14 is an exploded perspective view illustrating a part of the optical adapter of FIG. 13 in an exploded manner.
Figure 15:
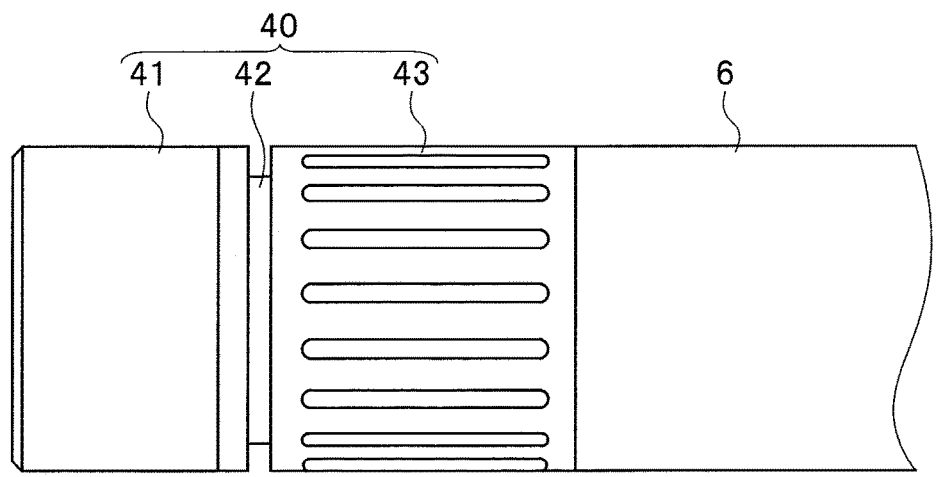
FIG. 15 is a side view of the optical adapter of FIG. 13.

FIGS. 13 to 21 are diagrams illustrating an optical adapter of the second embodiment of the present invention. FIG. 13 is a perspective view of the optical adapter of the second embodiment of the present invention. FIG. 14 is an exploded perspective view illustrating a part of the optical adapter of the second embodiment of the present invention in an exploded manner. FIG. 15 is a side view of the optical adapter of the second embodiment of the present invention.

Figure 16:
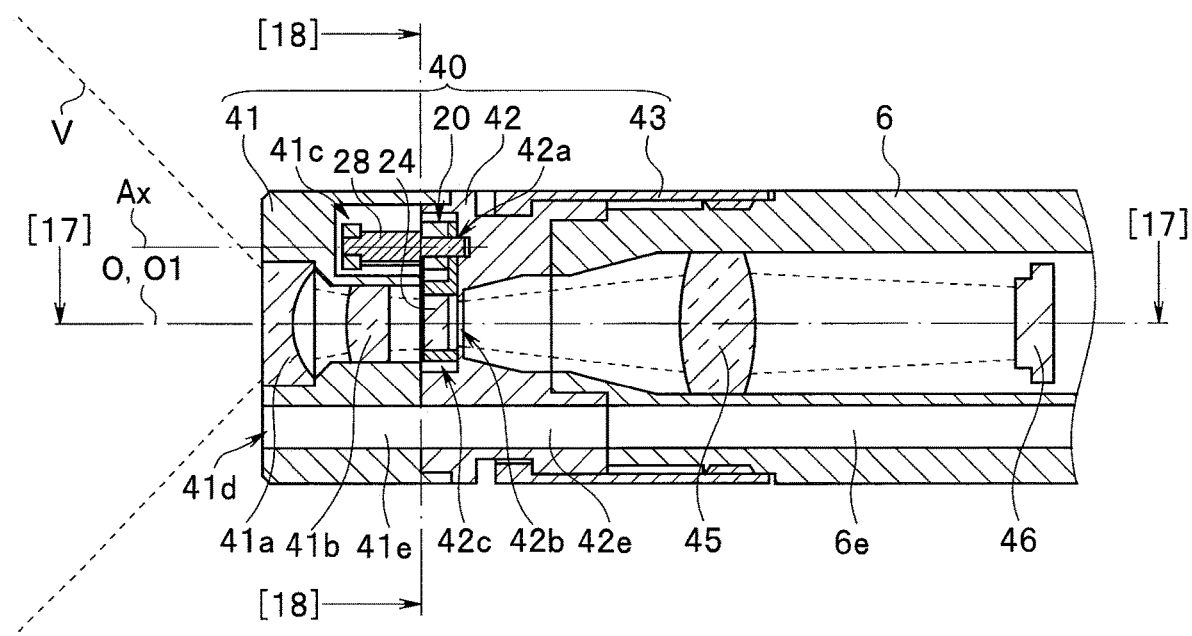
FIG. 16 is a cross-sectional view taken along a plane indicated by [16]-[16] in FIG. 13 (a state in which a holding frame is at a first position)
Figure 17:
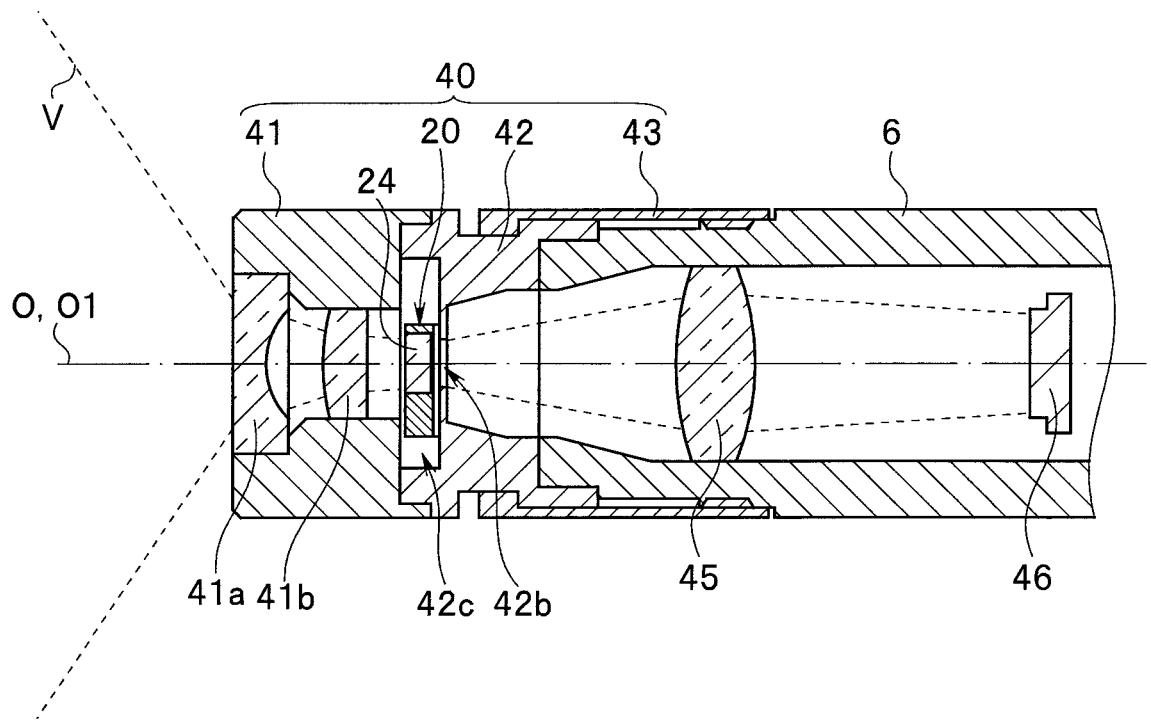
FIG. 17 is a cross-sectional view taken along a line [17]-[17] of FIG. 16 (a state in which the holding frame is at the first position)
Figure 18:
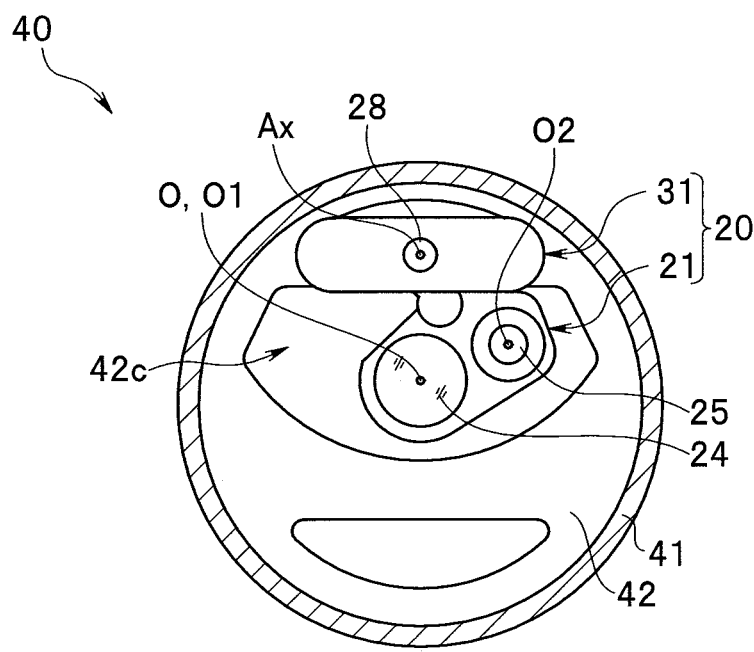
FIG. 18 is a cross-sectional view taken along a line [18]-[18] of FIG. 16 (a state in which the holding frame is at the first position)

FIG. 16 is a cross-sectional view taken along a plane indicated by [16]-[16] in FIG. 13. FIG. 17 is a cross-sectional view taken along a line [17]-[17] of FIG. 16. FIG. 18 is a cross-sectional view taken along a line [18]-[18] of FIG. 16. Note that FIGS. 13 to 18 illustrate a state in which the holding frame of the movable optical unit is at the first position.

Figure 19:
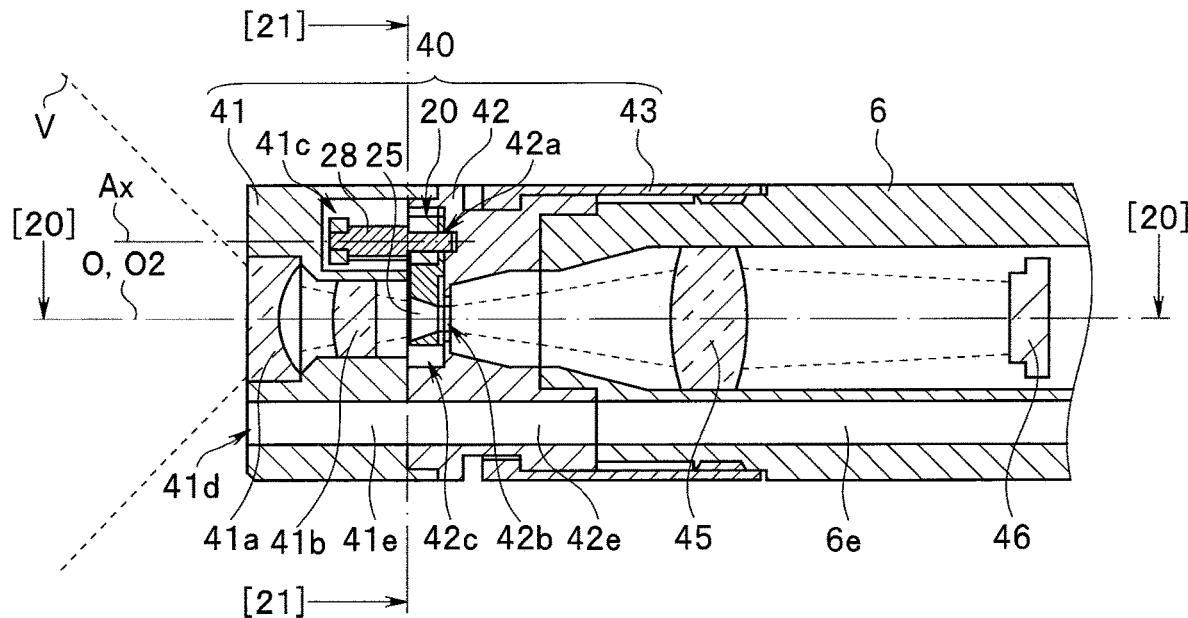
FIG. 19 is a cross-sectional view corresponding to the cross section taken along the plane indicated by [16]-[16] in FIG. 13 (a state in which the holding frame is at a second position)
Figure 20:
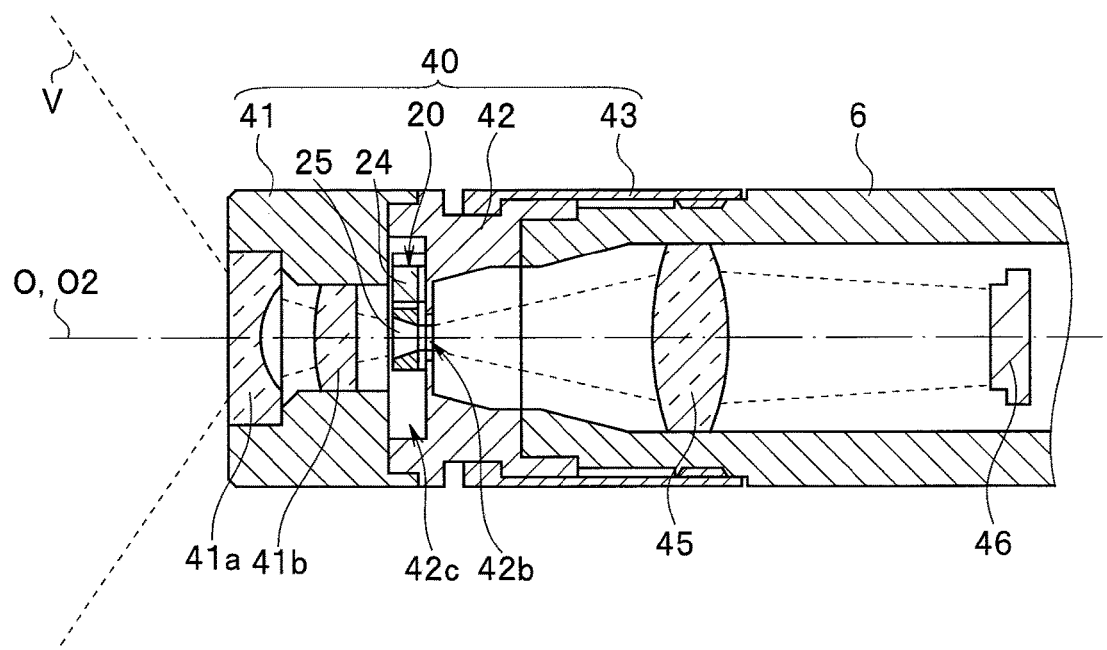
FIG. 20 is a cross-sectional view corresponding to the cross section taken along the line [20]-[20] of FIG. 19 (a state in which the holding frame is at the second position)
Figure 21:
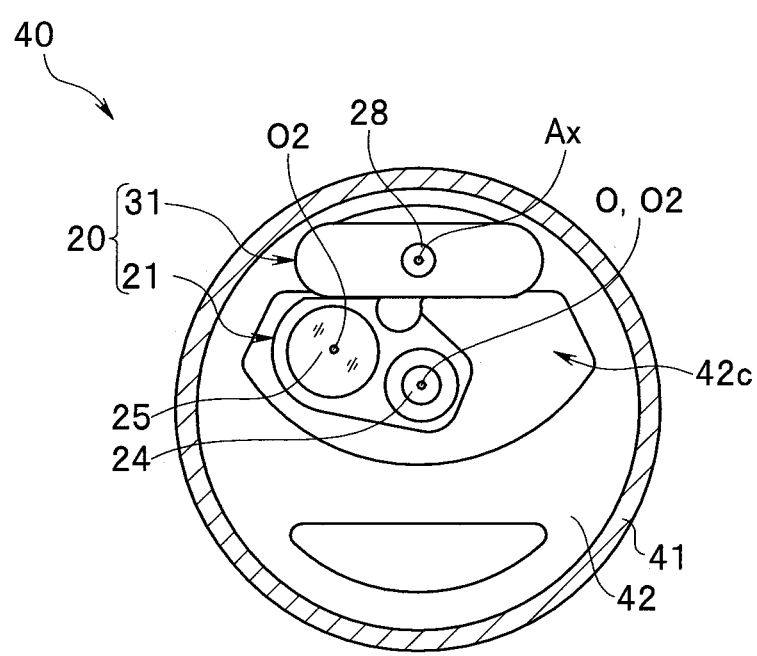
FIG. 21 is a cross-sectional view taken along a line [21]-[21] of FIG. 19 (a state in which the holding frame is at the second position).

In addition, FIGS. 19 to 21 illustrate a state in which the holding frame of the movable optical unit is at the second position. Here, FIG. 19 is a cross-sectional view corresponding to the cross section taken along the plane indicated by [16]-[6] in FIG. 13. FIG. 20 is a cross-sectional view corresponding to a cross section taken along a line [20]-[20] of FIG. 19. FIG. 21 is a cross-sectional view taken along a line [21]-[21] of FIG. 19. Note that FIGS. 13 to 21 illustrate a state in which the optical adapter of the present embodiment is attached to the distal end portion of the insertion portion of the endoscope apparatus.

First, the configuration of the optical adapter of the present embodiment will be described below with reference to FIGS. 13 to 18.

The optical adapter 40 of the present embodiment is an optical adapter configured to be attachable to and detachable from the distal end portion 6 of the insertion portion 2 of the endoscope apparatus 1 illustrated in FIG. 1. The optical adapter 40 includes the optical apparatus 20 including the movable optical unit 21 of the above-described embodiment. When the optical adapter 40 is attached to a predetermined position of the distal end portion 6 of the endoscope apparatus 1, the observation optical system of the endoscope apparatus 1 can be switched between a state in which focusing is performed in a first focus range (far point) and a state in which focusing is performed in a second focus range (near point).

As illustrated in the drawings, the optical adapter 40 of the present embodiment is configured mainly of a distal end cover 41, an adapter main body 42, a coupling member 43 (not illustrated in FIG. 18), and the optical apparatus 20 (not illustrated in FIGS. 13 and 15).

The distal end cover 41 is provided at a portion on the distal end side of the optical adapter 40. Optical members (41a, 41b; see FIGS. 16 and 17) that configure a part of the observation optical system of the endoscope apparatus 1 when the optical adapter 40 is attached to a predetermined position of the distal end portion 6 of the endoscope apparatus 1 are fixed inside the distal end cover 41. The optical axis of the optical member (41a, 41b) is provided at a position that substantially coincides with the optical axis O of the observation optical system of the endoscope apparatus 1 when the optical adapter 40 is attached to a predetermined position of the distal end portion 6 of the endoscope apparatus 1.

Note that in the optical adapter 40 of the present embodiment, a configuration example is illustrated in which the observation window member 41a (not illustrated in FIGS. 15 and 18) fixed to the distal end surface of the distal end cover 41 and the optical lens 41b fixed to the rear side on the optical axis of the observation window member 41a and having predetermined optical characteristics are provided as optical members provided in the distal end cover 41. The observation window member 41a is a transparent optical member having a function as an opening window for guiding the light flux from the observation object to the inside of the optical adapter 40. The form of the optical member provided in the optical adapter 40 is not limited to this form, and a predetermined form may be appropriately adopted.

The distal end cover 41 is formed in a substantially cylindrical shape as a whole. As described above, the observation window member 41a is fixed to the distal end surface of the distal end cover 41. In addition, an illumination opening 41d or the like for emitting illumination light toward the front is provided on the distal end surface of the distal end cover 41. An illumination light guide path 41e (see FIGS. 16 and 19) is provided in the rear side of the illumination opening 41d. A light guide (not illustrated) is disposed in the illumination light guide path 41e.

A proximal end surface of the distal end cover 41 is consecutively connected to a distal end surface of the adapter main body 42.

Further, a space 41c (see FIG. 16) for accommodating a part of the optical apparatus 20 (specifically, a part of the electromagnetic drive unit 31) is formed inside the distal end cover 41.

The adapter main body 42 is a main constituent member of the optical adapter 40. The optical apparatus 20 is disposed on the front surface side of the adapter main body 42. Therefore, a shaft hole 42a, a light flux opening 42b, and a holding frame movable space 42c are formed on the front surface side of the adapter main body 42 (see FIG. 14). Among them, the shaft hole 42a is a hole portion that pivotally supports one end of the fixed shaft 28 of the optical apparatus 20. In addition, the light flux opening 42b is an opening that allows to pass therethrough the light flux from the observation object, the light being guided to the inside of the optical adapter 40 through the observation window member 41a. The holding frame movable space 42c is a space in which the movable optical unit 21 of the optical apparatus 20 is accommodated and which allows the holding frame 22 to move when the movable optical unit 21 rotates around the fixed shaft 28 (shaft hole 42a) as a central axis.

Further, an illumination light guide path 42e (see FIGS. 16 and 19) is formed in the adapter main body 42. A light guide (not illustrated) is disposed in the illumination light guide path 42e. When the distal end cover 41 is attached to the front surface of the adapter main body 42, the illumination light guide path 41e of the distal end cover 41 is coupled to the illumination light guide path 42e of the adapter main body 42.

Further, when the optical adapter 40 is attached to the front surface of the distal end portion 6, the illumination light guide path 42e is coupled to the light guide path 6e provided in the distal end portion 6. A light guide (not illustrated) is disposed in the light guide path 6e. The light guide is a light guide member that guides illumination light emitted from a light source apparatus provided inside the main body portion 3 to the distal end of the distal end portion 6.

The coupling member 43 is a member for coupling the adapter main body 42 and the distal end of the distal end portion 6 of the insertion portion 2 to attach the optical adapter 40 to a predetermined position (distal end portion) of the distal end portion 6. The coupling member 43 is formed in a substantially cylindrical shape with both ends in the axial direction opened. The optical adapter 40 is attachable to and detachable from the distal end of the distal end portion 6 of the insertion portion 2 through a predetermined coupling means provided in the coupling member 43. It is assumed that a known technique adopted in an existing optical adapter or the like is applied to the coupling means between the coupling member 43 and the distal end of the distal end portion 6 of the insertion portion 2, and detailed illustration and description thereof are omitted.

The optical apparatus 20 has the same configuration as that exemplified in the first embodiment described above. That is, the optical apparatus 20 is configured of the movable optical unit 21 and the electromagnetic drive unit 31. As described above, one end of the fixed shaft 28 of the movable optical unit 21 is fixed to the shaft hole 42a of the adapter main body 42. In addition, as described above, the distal end of the fixed shaft 28 is fixed to the yoke 32 of the electromagnetic drive unit 31. The fixed shaft 28 is inserted into the bearing 26 of the movable optical unit 21. The movable optical unit 21 rotates around the central axis Ax of the fixed shaft 28 by controlling energization to the electromagnetic drive unit 31. The respective central axes O1 and O2 of the optical lens 24 and the aperture member 25 held by the holding frame 22 are alternatively arranged at a position that substantially coincides with the optical axis O of the observation optical system of the endoscope apparatus 1.

In addition, a basic observation optical system 45 in the endoscope apparatus 1, an image pickup device 46 (and an electric circuit unit including a driving circuit and a signal processing circuit; not illustrated) that receives an optical image formed by the observation optical system 45 and performs signal processing such as photoelectric conversion to generate predetermined image data, and the like are disposed inside the distal end portion 6. A basic internal configuration of the distal end portion 6 is assumed to be a general configuration formed using an existing known technique, and a detailed description thereof will be omitted.

With such a configuration, for example, when the endoscope apparatus 1 is used alone (when the optical adapter 40 is not attached), the observation optical system 45 functions only by itself and has predetermined optical characteristics. Then, the observation optical system 45 forms an optical image of a predetermined observation object on the light receiving surface of the image pickup device 46.

Further, when the optical adapter 40 of the present embodiment is attached to the endoscope apparatus 1, in addition to the original observation optical system 45 provided in the distal end portion 6, the optical members (41a, 41b) provided in the optical adapter 40 and any one of the optical members (24, 25) included in the optical apparatus 20 are arranged side by side on the optical axis O, whereby an observation optical system having different predetermined optical characteristics is formed. The observation optical system (45+41a, 41b+24 or 25) having different predetermined optical characteristics forms an optical image of a predetermined observation object on the light receiving surface of the image pickup device 46.

Note that in the optical apparatus 20 included in the optical adapter 40 of the present embodiment, when the optical lens 24 is arranged on the optical axis O of the observation optical system (that is, when the holding frame 22 is arranged at the first position; see FIGS. 13 to 18), focus is set at a point farther than a predetermined distance from the front surface of the optical adapter 40, for example, in a predetermined range (far point) farther than about 15 mm (first focus range). In this case, since the amount of light passing through the observation optical system can be increased, a brighter image can be obtained.

In addition, when the aperture member 25 is arranged on the optical axis O of the observation optical system (that is, when the holding frame 22 is arranged at the second position; see FIGS. 19 to 21), focus is set within a close range from the front surface of the optical adapter 40, for example, within a near point range of about 5 mm to 18 mm (second focus range). In this case, a deeper observation depth can be obtained by reducing the amount of light passing through the observation optical system by the aperture member 25.

In general, when focusing on a near point using an optical system, the observation depth tends to be shallow. In consideration of this, at the time of focusing on the near point (when the holding frame 22 is arranged at the second position), the amount of light is reduced by the aperture member 25. Accordingly, the observation depth is set to be deep. Therefore, it is possible to observe an observation object at the near point at a deeper observation depth.

As described above, the optical adapter 40 of the present embodiment is configured such that the focus range can be switched by rotating the movable optical unit 21 by controlling energization to the electromagnetic drive unit 31 in a state in which the optical adapter 40 is attached to the distal end of the distal end portion 6 of the endoscope apparatus 1 and alternatively arranging either the optical lens 24 or the aperture member 25 on the optical axis O of the observation optical system.

Note that the operation of the optical apparatus 20 applied to the optical adapter 40 of the present embodiment is similar to that of the first embodiment described above. Further, as the movable optical unit 21 included in the optical apparatus 20 applied to the optical adapter 40 of the present embodiment, not only, the configuration of the first embodiment described above but also the configurations of the first to third modifications described above can be similarly applied.

The present invention is not limited to the above-described embodiments, and various modifications and applications can be made in the range without departing from the scope of the invention. Furthermore, the above-described embodiments include inventions at various stages, and various inventions may be extracted by appropriately combining a plurality of configuration requirements disclosed. For example, even when some configuration requirements are deleted from all the configuration requirements described in the above embodiment, in a case where the problems of the invention may be solved and the effects of the invention may be obtained, the configuration from which the configuration requirements are deleted may be extracted as the invention. Furthermore, constituent elements in different embodiments may be appropriately combined. The invention is limited by the appended claims, otherwise, not restricted by the specific embodiments thereof.

What is claimed is:

1. A movable optical unit configured to be rotatable around an axis by an electromagnet comprising:
   a fixed shaft;
   a bearing through which the fixed shaft is inserted and which is polarized in a direction orthogonal to a long axis of the fixed shaft, the bearing having a rear face and a front face that are orthogonal to the long axis;
   a holding frame that is provided to be rotatable around the fixed shaft and holds at least one optical member; and
   a pair of arm members extending outward from the holding frame in a direction orthogonal to the long axis of the fixed shaft, wherein
   the pair of arm members are bonded to the bearing in a state of sandwiching the bearing in a direction along the long axis of the fixed shaft, and
   the pair of arm members include a first arm member and a second arm member, and the first and second arm members sandwich the bearing by the first arm member coming into contact with the rear face of the bearing and the second arm member coming into contact with the front face of the bearing.

2. The movable optical unit according to claim 1, wherein the first arm member formed is integrally formed with the holding frame and the second arm member is formed separately from the holding frame, and
   the second arm member is integrated with the holding frame by adhesive bonding to the holding frame.

3. The movable optical unit according to claim 1, wherein the bearing is formed of an annular magnet member having an insertion hole, the fixed shaft is inserted into the insertion hole in a state where the bearing is bonded to the first and second arm members, and the holding frame is rotatable around the fixed shaft.

4. The movable optical unit according to claim 1, wherein the at least one optical member comprises a plurality of optical members, each held by the holding frame, and
   one of the plurality of optical members is selectively arranged at a predetermined position due to the holding frame rotating around the fixed shaft.

5. The movable optical unit according to claim 4, wherein the plurality of optical members includes a first optical member formed of parallel flat glass and a second optical member formed of an aperture member having an aperture opening.

6. The movable optical unit according to claim 1, wherein the bearing is formed of an annular magnet member and has a projecting portion provided to project radially outward from an outer peripheral surface, and
   the first and second arm members are formed integrally with the holding frame, and are bonded to the bearing in a state of sandwiching the projecting portion in a direction along the long axis of the fixed shaft.

7. The movable optical unit according to claim 1, wherein the holding frame is formed by diffusion bonding, and
   at least one of the first and second arm members is formed integrally with the holding frame by part of the diffusion bonding.

8. The movable optical unit according to claim 1, wherein the bearing is entirely disposed between the first and second arm members in a direction along the long axis.

9. The movable optical unit according to claim 1, wherein the first and second arm members include first and second extending portions, respectively, and the holding frame is attached to the first and second arm members by the first and second extending portions.

10. The movable optical unit according to claim 9, wherein the first and second extending portions project radially outward only from a portion of an outer peripheral surface of the first and second arm members, respectively.

11. An optical adapter configured to be attachable to and detachable from a distal end portion of an insertion portion of an endoscope apparatus comprising an optical apparatus including:
    a movable optical unit comprising:
        a fixed shaft,
        a bearing through which the fixed shaft is inserted and which is polarized in a direction orthogonal to a long axis of the fixed shaft, the bearing having a rear face and a front face that are orthogonal to the long axis,
        a holding frame that is provided to be rotatable around the fixed shaft and holds at least one optical member, and
        a pair of arm members extending outward from the holding frame in a direction orthogonal to the long axis of the fixed shaft,
        wherein the pair of arm members being bonded to the bearing in a state of sandwiching the bearing in a direction along the long axis of the fixed shaft and configured to be rotatable around the fixed shaft; and
        the pair of arm members include a first arm member and a second arm member, and the first and second arm members sandwich the bearing by the first arm member coming into contact with the rear face of the bearing and the second arm member coming into contact with the front face of the bearing, and
    an electromagnetic drive unit that has an electromagnet acting on a magnetic pole of the bearing and rotates the bearing around the fixed shaft by the electromagnet.

12. The optical adapter according to claim 11, wherein the holding frame further includes an aperture member that regulates an amount of transmitted light of light flux from an observation object,
    when the holding frame is arranged at a first position, a first focus range in which an optical image of an observation object at a point farther than a predetermined distance is formed is set, and
    when the holding frame is arranged at a second position, due to the aperture member being arranged on the optical axis of the observation optical system, a second focus range in which an optical image of an observation object closer than the first focus range is formed is set.

13. An endoscope apparatus provided with an optical apparatus including a movable optical unit at a distal end portion of an insertion portion, the endoscope apparatus comprising:
    the optical apparatus including:
        the movable optical unit comprising:
            a fixed shaft,
            a bearing through which the fixed shaft is inserted and which is polarized in a direction orthogonal to a long axis of the fixed shaft, the bearing having a rear face and a front face that are orthogonal to the long axis,
            a holding frame provided to be rotatable around the fixed shaft and holding at least one optical member, and
            a pair of arm members extending outward from the holding frame in a direction orthogonal to the long axis of the fixed shaft, wherein the pair of arm members being bonded to the bearing in a state of sandwiching the bearing in a direction along the long axis of the fixed shaft and configured to be rotatable around the fixed shaft, and the pair of arm members include a first arm member and a second arm member, and the first and second arm members sandwich the bearing by the first arm member coming into contact with the rear face of the bearing and the second arm member coming into contact with the front face of the bearing, an electromagnetic drive unit that has an electromagnet acting on a magnetic pole of the bearing and rotates the bearing around the fixed axis by the electromagnet;

an observation optical system that forms an optical image of an observation object on a predetermined light receiving surface; and an image pickup device that receives an optical image formed by the observation optical system and performs predetermined photoelectric conversion, wherein by rotating the bearing around the fixed shaft by the electromagnetic drive unit, the holding frame is rotated between a first position where the optical member is positioned on an optical axis of the observation optical system and a second position where the optical member is retracted from an optical axis of the observation optical system.

14. The endoscope apparatus according to claim 13, wherein the holding frame further includes an aperture member that regulates an amount of transmitted light of light flux from the observation object, when the holding frame is arranged at the first position, a first focus range in which an optical image of an observation object at a point farther than a predetermined distance is formed is set, and when the holding frame is arranged at the second position, due to the aperture member being arranged on the optical axis of the observation optical system, a second focus range in which an optical image of an observation object closer than the first focus range is formed is set.

* * * * *